United States Patent
Schoessler et al.

(10) Patent No.: US 11,945,117 B2
(45) Date of Patent: Apr. 2, 2024

(54) ANTICIPATING USER AND OBJECT POSES THROUGH TASK-BASED EXTRAPOLATION FOR ROBOT-HUMAN COLLISION AVOIDANCE

(71) Applicant: Samsung Electronics Company, Ltd., Suwon si (KR)

(72) Inventors: Philipp Schoessler, Scotts Valley, CA (US); Brian Harms, San Jose, CA (US); Kathleen Sofia Hajash, San Francisco, CA (US); Dane Mason, San Francisco, CA (US)

(73) Assignee: Samsung Electronics Co., Ltd., Suwon si (KR)

( * ) Notice: Subject to any disclaimer, the term of this patent is extended or adjusted under 35 U.S.C. 154(b) by 248 days.

(21) Appl. No.: 17/198,128

(22) Filed: Mar. 10, 2021

(65) Prior Publication Data

US 2022/0288781 A1    Sep. 15, 2022

(51) Int. Cl.
*B25J 9/16*    (2006.01)
*B25J 13/08*    (2006.01)

(52) U.S. Cl.
CPC ............. *B25J 9/1666* (2013.01); *B25J 9/163* (2013.01); *B25J 9/1651* (2013.01); *B25J 9/1661* (2013.01); *B25J 13/089* (2013.01); *B25J 9/1697* (2013.01)

(58) Field of Classification Search
CPC ........ B25J 9/1666; B25J 9/163; B25J 9/1651; B25J 9/1661; B25J 13/089; B25J 9/1697; B25J 9/1676; B25J 11/0045; G05B 2219/40102; G05B 2219/40104; G05B 2219/40202; G05B 2219/40475
See application file for complete search history.

(56) References Cited

U.S. PATENT DOCUMENTS

| | | |
|---|---|---|
| 7,751,938 B2 | 7/2010 | Tsusaka |
| 8,452,451 B1 | 5/2013 | Francis, Jr. |
| 8,855,814 B2 | 10/2014 | Kim |
| 8,972,057 B1 | 3/2015 | Freeman |
| 2010/0204828 A1 | 8/2010 | Yoshizawa |

(Continued)

FOREIGN PATENT DOCUMENTS

| | | |
|---|---|---|
| DE | 102006055917 | 6/2008 |
| EP | 3578322 | 11/2019 |

(Continued)

OTHER PUBLICATIONS

PCT Search Report in PCT/KR2022/003240, dated Jun. 16, 2022.

(Continued)

*Primary Examiner* — Jonathan L Sample
*Assistant Examiner* — Matthew C Gammon

(57) ABSTRACT

An example method includes determining objects and actions associated with the objects for completing a task to be executed by a robotic system, where each action is associated with trajectory. The method further includes determining a pose for each person in an environment associated with the robotic system, predicting a trajectory for each person based on the determined pose associated with the respective person and the actions and trajectories associated with the actions, and adjusting trajectories for one or more of the actions to be performed by the robotic system based on the predicted trajectories for each person.

20 Claims, 14 Drawing Sheets

(56) References Cited

U.S. PATENT DOCUMENTS

| | | |
|---|---|---|
| 2010/0231506 A1 | 9/2010 | Pryor |
| 2011/0208355 A1 | 8/2011 | Tsusaka |
| 2012/0156362 A1 | 6/2012 | Sadovoy |
| 2016/0167228 A1 | 6/2016 | Wellman |
| 2018/0029226 A1 | 2/2018 | Dani |
| 2018/0290302 A1 | 10/2018 | Wang |
| 2019/0084158 A1 | 3/2019 | Atherton |
| 2019/0143512 A1 | 5/2019 | Corkum |
| 2019/0143517 A1 | 5/2019 | Yang |
| 2019/0366543 A1 | 12/2019 | Butterfoss |
| 2019/0381654 A1 | 12/2019 | Oleynik |
| 2020/0001463 A1 | 1/2020 | Kim |
| 2020/0086487 A1 | 3/2020 | Johnson |
| 2020/0130192 A1 | 4/2020 | Ogawa |
| 2021/0069910 A1 | 3/2021 | Oleynik |
| 2021/0197378 A1 | 7/2021 | Schonherr |
| 2021/0276188 A1 | 9/2021 | Tang |
| 2021/0284198 A1* | 9/2021 | Schmidt ............ B60W 60/0015 |
| 2021/0308865 A1 | 10/2021 | Lin |
| 2021/0309264 A1* | 10/2021 | Felip Leon ............ B25J 9/1666 |
| 2021/0387350 A1* | 12/2021 | Oleynik ................. A47J 44/00 |
| 2022/0032461 A1 | 2/2022 | Gupta |
| 2022/0250240 A1 | 8/2022 | Gaydarov |
| 2022/0371195 A1 | 11/2022 | Lee |
| 2023/0330857 A1 | 10/2023 | Verschueren et al. |

FOREIGN PATENT DOCUMENTS

| | | |
|---|---|---|
| EP | 3684559 | 7/2020 |
| JP | 2018-158393 A | 10/2018 |
| JP | 2019-123022 A | 7/2019 |
| JP | 6060841 | 8/2019 |
| JP | 2020082217 | 6/2020 |
| JP | 2020097091 | 6/2020 |
| KR | 2011-0015833 A | 2/2011 |
| KR | 20160124770 | 10/2016 |
| KR | 2018-0114698 | 10/2018 |
| WO | WO 2019/029870 | 2/2019 |
| WO | WO 2019/053474 | 3/2019 |
| WO | WO 2020-017092 | 1/2020 |
| WO | WO 2020-075526 A1 | 4/2020 |

OTHER PUBLICATIONS

PCT Written Decision in PCT/KR2022/003240, dated Jun. 16, 2022.
Choreograph programming interface by Automata https://automata.tech/programming-eva-choreograph-and-the-api/, Downloaded from web Jan. 25, 2021.
PCT Search Report in PCT/KR2022/000950, dated May 10, 2022.
PCT Written Decision in PCT/KR2022/000950, dated May 10, 2022.
PCT Search Report in PCT/KR2022/004300, dated Jul. 8, 2022.
PCT Written Opinion in PCT/KR2022/004300, dated Jul. 8, 2022.
Final office action in U.S. Appl. No. 17/217,806, dated Apr. 10, 2023.
Final office action in U.S. Appl. No. 17/198,152, dated Apr. 21, 2023.
Non-final office action in U.S. Appl. No. 17/198,152, dated Jan. 18, 2023.
Non-final office action in U.S. Appl. No. 17/217,806, dated Jan. 25, 2023.
Notice of Allowance in U.S. Appl. No. 17/217,806, dated Jun. 30, 2023.
Non-final office action in U.S. Appl. No. 17/198,152, dated Jul. 21, 2023.
Final office action in U.S. Appl. No. 17/198,152, dated Aug. 22, 2023.
Non-final office action in U.S. Appl. No. 17/198,152, dated Oct. 23, 2023.
Final office action in U.S. Appl. No. 17/198,152, dated Feb. 13, 2024.

* cited by examiner

ANTICIPATING USER AND OBJECT POSES THROUGH TASK-BASED EXTRAPOLATION FOR ROBOT-HUMAN COLLISION AVOIDANCE

TECHNICAL FIELD

This disclosure relates generally to robotics, and in particular relates to machine-learning for robotics.

BACKGROUND

A robot is a machine, especially one programmable by a computer, capable of carrying out a complex series of actions automatically. Robots may be guided by an external control device or the control may be embedded within. Robots may be constructed on the lines of human form, but most robots are machines designed to perform a task with no regard to their aesthetics. Robots may be autonomous or semi-autonomous and range from humanoids to industrial robots, medical operating robots, patient assist robots, dog therapy robots, collectively programmed swarm robots, UAV drones, and even microscopic nano robots. By mimicking a lifelike appearance or automating movements, a robot may convey a sense of intelligence or thought of its own. Autonomous things may be expected to proliferate in the coming decade, with home robotics and the autonomous car as some of the main drivers.

The branch of technology that deals with the design, construction, operation, and application of robots, as well as computer systems for their control, sensory feedback, and information processing is robotics. These technologies deal with automated machines that can take the place of humans in dangerous environments or manufacturing processes, or resemble humans in appearance, behavior, or cognition. Many of today's robots are inspired by nature contributing to the field of bio-inspired robotics. Robots have replaced humans in performing repetitive and dangerous tasks which humans prefer not to do, or are unable to do because of size limitations, or which take place in extreme environments such as outer space or the bottom of the sea.

DESCRIPTION OF EXAMPLE EMBODIMENTS

Robotic System

Figure 1:
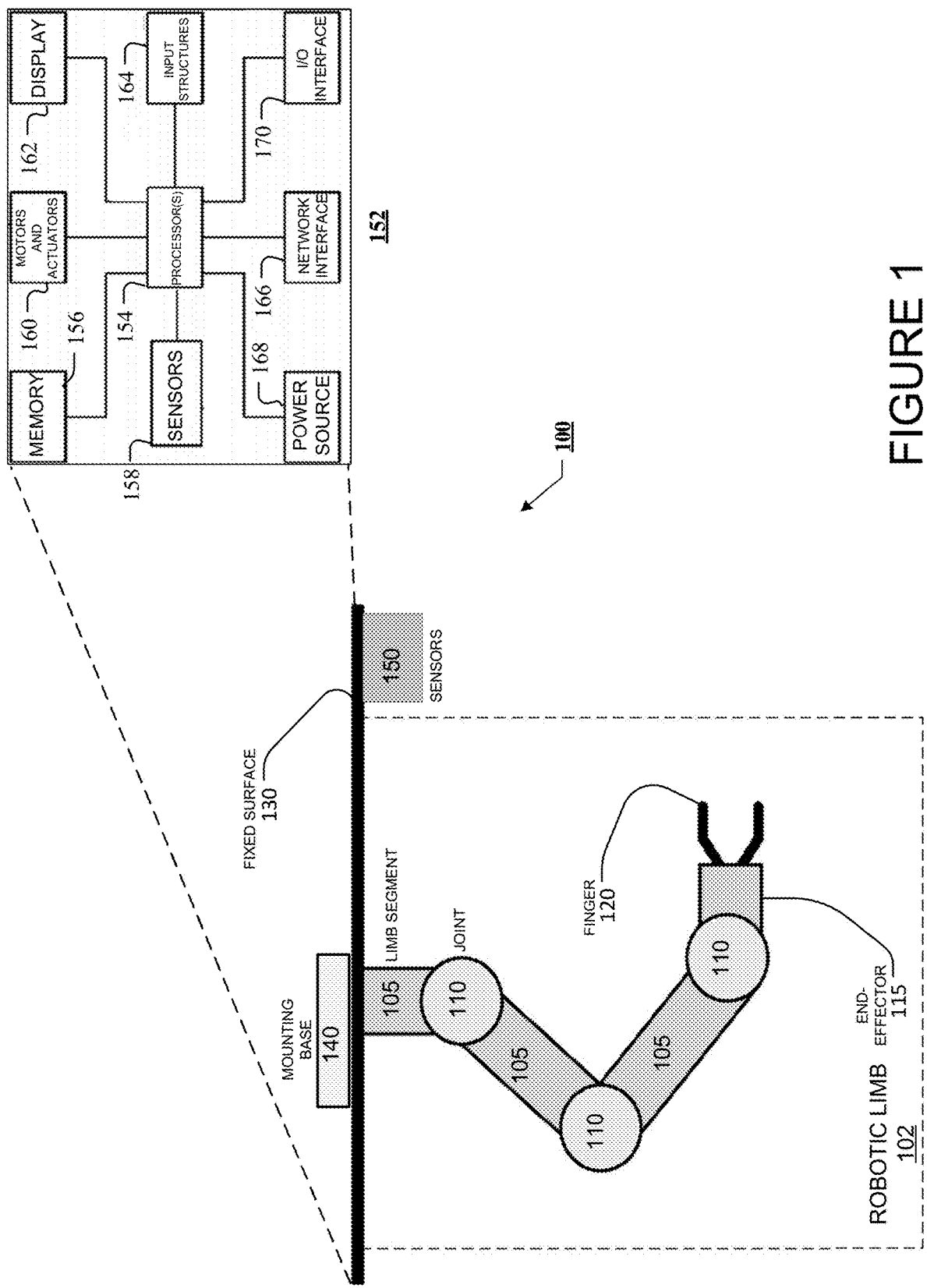
FIG. 1 illustrates an example robotic system chosen below.

This disclosure describes systems and methods that combine lightweight and low-cost components with captured sensor data from one or more sensors, such as image sensors, to increase the accuracy and precision of the robotic system through software. Image sensors are often affordable relative to robotic limb components and can be accurate for measuring distances and poses of objects within their respective fields of view.

In particular embodiments, a robotic system 100 may include a robotic limb that may perform operations to provide services to one or more users in different tasks such as cooking, gardening, painting, etc. Robotic limb 102 may include any suitable combination of one or more limb segment 105, joint 110, and end-effector 115. In some embodiments, robotic limb 102 may further include one or more manipulators. As an example and not by way of limitation, this manipulator may include one or more fingers 120, a suction-based gripper, or a jammable-based gripper. In some embodiments, robotic limb 102 may be connected at one end to a fixed surface 130. As an example and not by way of limitation, this fixed surface may include a wall, a ceiling, a cabinet, a workbench, etc. As further depicted by FIG. 1, the robotic system 100 may include an onboard computing system 152 that may be utilized for the operation of the robotic limb 102, in accordance with the presently disclosed embodiments. The onboard computing system may track multiple components of a robotic limb, such as joints, end-effectors, grippers, fingers, etc., and adjusts their pose accordingly until a desired pose is reached. A pose may include either of, or both of, the position in three-dimensional (3D) space and the orientation of the one or more components of the robotic limb.

For example, in some embodiments, the onboard computing system 152 may include, among other things, one or more processor(s) 154, memory 156, sensors 158, one or more motors and actuators 160, a display 162, input structures 164, network interfaces 166, a power source 168, and an input/output (I/O) interface 170. It should be noted that FIG. 1 is merely one example of a particular implementation and is intended to illustrate the types of components that may be present in the robotic system 100. As depicted, the one or more processor(s) 154 may be operably coupled with the memory 156 to perform various algorithms for instructing the robotic limb 102 to perform different operations. Such programs or instructions executed by the processor(s) 154 may be stored in any suitable article of manufacture that includes one or more tangible, computer-readable media at least collectively storing the instructions or routines, such as the memory 156. The memory 156 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 154 to enable the robotic limb 102 to perform various functionalities.

In certain embodiments, the sensors 158 may include, for example, one or more cameras (e.g., depth cameras), touch sensors, microphones, motion detection sensors, thermal detection sensors, light detection sensors, time of flight (ToF) sensors (e.g., LiDAR system), ultrasonic sensors, infrared sensors, or other similar sensors that may be utilized to detect various user inputs (e.g., user voice inputs, user gesture inputs, user touch inputs, user instrument inputs, user motion inputs, and so forth). The motors and actuators 160 may include any number of electronic motors (e.g., DC motors) that may be utilized to drive actuators, which may allow the robotic limb 102 to perform various mechanical operations and/or motional operations (e.g., walking, head and neck motions, limb and joint motions, body motions, dance motions, eye motions, and so forth). The display 162 may include any display architecture (e.g., LCD, OLED, e-Ink, and so forth), which may provide further means by which users may interact and engage with the robotic limb 102.

In certain embodiments, the input structures 164 may include any physical structures utilized to control one or more global functions of the robotic limb 102 (e.g., pressing a button to power "ON" or power "OFF" the robotic limb 102). The network interface 166 may include, for example, any number of network interfaces suitable for allowing the robotic limb 102 to access and receive data over one or more cloud-based networks (e.g., a cloud-based service that may service hundreds or thousands of the robotic limb 102 and the associated users corresponding thereto) and/or distributed networks. The power source 168 may include any suitable source of power, such as a rechargeable lithium polymer (Li-poly) battery and/or an alternating current (AC) power converter that may be utilized to power and/or charge the robotic limb 102 for operation. Similarly, the I/O interface 170 may be provided to allow the robotic limb 102 to interface with various other electronic or computing devices, such as one or more auxiliary electronic devices.

In particular embodiments, the onboard computing system 152 may instruct the robotic limb 102 to achieve a desired pose. The onboard computing system 152 may access sensor data representing a scene from one or more sensors. These sensors may comprise for example and not by way of limitation, one or more three-dimensional (3D) cameras, LIDAR, DVS, or RGB-D cameras. In particular embodiments, the sensor data may comprise image data (such as RGB-D or depth images). In particular embodiments, non-image based data (such as RFID data) may be used instead of, or in conjunction with, the image data. The sensor data may represent a scene that includes a least a portion of the robotic limb 102 that can thus be utilized by the computing device for various functions related to pose of the robotic limb 102. This disclosure contemplates that the one or more sensors can be located on the robotic limb 102 or external to the robotic limb 102, or both. Other sensors for sensing the pose of the robotic limb 102 may be built into the robotic system 100 of which the limb 102 is a part, and may include joint encoders, computation encoders, limit switches, motor current sensors, or any suitable combination thereof.

In particular embodiments, the onboard computing system 152 may isolate at least a portion of the sensor data that represents at least a portion of the robotic limb 102. As an example and not by way of limitation, this may be completed through a point cloud technique. In particular embodiments, the onboard computing system 152 may use 3D depth sensor data to record one or more snapshots of the point cloud of positional data points of the scene. These data points may include information about one or more external surfaces contained in the scene, including the external surfaces of the robotic limb 102, the table surface, and one or more objects contained in the scene. From this, the onboard computing system 152 may isolate a two-dimensional (2D) region that contains at least a portion of one or more objects contained within the scene. From at least a portion of the sensor data, the onboard computing system 152 may create one or more RGB-D clusters of various objects in the scene. In particular embodiments, the one or more RGB-D clusters of various objects includes the robotic limb 102 contained within the scene.

In particular embodiments, the scene may contain one or more objects that are further isolated by the onboard computing system 152. Upon isolating the one or more objects in the scene, the onboard computing system 152 may classify the one or more RGB-D clusters of various objects in the scene created from the portion of the sensor data. This classification may be conducted by the onboard computing system 152 via any method of classification, including for example and not by way of limitation manual identification by a user or any method of artificial intelligence, including computer vision, machine learning, neural networks, or deep learning. Variations of neural networks utilized for classification may include, for example and not by way of limitation, three-dimensional segmentation networks (3DSNs) such as three-dimensional convolutional neural networks (3DCNNs), Deep Kd-networks, regional convolutional neural networks (RCNNs), or recurrent neural networks (RNNs). In particular embodiments, this classification may determine that at least one of the one or more objects within a scene is a robotic limb 102. In particular embodiments, the onboard computing system 152 may additionally classify other objects contained within a scene, including for example but not by way of limitation, a coffee mug, a bottle, a vase, a spoon, a plate, a screwdriver, a light bulb, a hand or arm, etc.

While the present embodiments may be discussed below primarily with respect to a robotic limb, it should be appreciated that the present techniques may be applied to any of various robotic devices that may perform various operations to provide services to users. In particular embodiments, the robotic device may comprise any electronic device or computing device that may be configured with computer-based intelligence (e.g., machine learning [ML], artificial intelligence [AI], deep learning, cognitive computing, artificial neural networks [ANN], and so forth), which may be utilized by the robotic device to perform operations to provide services to users through, for example, motions, actions, gestures, body movements, facial expressions, limb and joint motions, display changes, lighting, sounds, and so forth. For example, in one embodiment, a robotic device may include a robot, a robotic limb, or similar AI or cognitive computing device that may be provided to contextually interact, instruct, operate, and engage with (e.g., in real-time or near real-time), for example, humans, pets, other robotic electronic devices, one or more servers, one or more cloud-based services, home appliances, electronic devices, automobiles, and so forth. Furthermore, as used herein, a robotic device may refer to any autonomous or semi-autonomous computing device capable of performing one or more mechanical and/or electromechanical motions or movements (e.g., human-like motions and movements) in response to, for example, one or more user inputs, one or more user commands (e.g., voice commands, gesture commands), one or more triggers (e.g., a time trigger, a keyword trigger, a tonal trigger, a user emotional response trigger, user motional trigger, a location trigger, an environmental trigger), and so forth.

Anticipating User and Object Poses Through Task-Based Extrapolation

Robotic manipulators (e.g. robot arms) have been slowly being used in different aspects of human society from industry, to hospitals, to restaurants, and slowly our homes. Yet, they may still have to conduct most of their work in isolation, or in a safe distance from humans to prevent human-robot collision and therefore potential injuries. This may be mostly due to their lack of understanding of their surroundings and the unpredictability of human behavior.

To address the above issue, the embodiments disclosed herein may give a robotic system 100 a better understanding of future human behavior and movement patterns to avoid collision. Based on such understanding, the robotic system 100 may plan movement trajectories and tasks in a way that minimizes robot-human interference. The embodiments disclosed herein may combine task knowledge and scene information to predict future object and human motion, and thus plan or change robot trajectories as to not interfere with the human. As an example and not by way of limitation, the embodiments disclosed herein may be used to improve the seamless collaboration between human and robot in a kitchen environment. As an example and not by way of limitation, the human and robot may be collaborating on cooking a recipe. The embodiments disclosed herein assume the recipe (and all required meta information) is known to the robot, and thus knowledge about tools and ingredients that are required to cook the recipe. The robotic system 100 may then utilize multiples sensors to collect information about the current environment (e.g. kitchen) to make a well-informed guess on human movement, and location changes that are most probable when cooking the recipe. Many tasks require interaction with tools, ingredients, or other objects. The embodiments disclosed herein may combine object trajectory prediction, and object affordance prediction, to create more contextual and accurate human motion forecasts. The embodiments disclosed herein may be used in other domains such as workbenches, factories, warehouses, laboratories, etc. Although this disclosure describes the embodiments being used in particular environment, this disclosure contemplates the embodiments disclosed herein being used in any suitable environment where a robotic system executes a task.

Certain technical challenges exist for task-based extrapolation for robot-human collision avoidance. One technical challenge may include modeling object relationships in task understanding. The solution presented by the embodiments disclosed herein to address this challenge may be using a scene graph built from object attributes, object poses, task information, 3D scene representation, and human poses as the scene graph may enable the robotic system 100 to keep a snapshot of the current state of the environment and allow the robotic system 100 to easily query necessary data and their relationships for future predictions. Another technical challenge may include effectively predicting human motion. The solution presented by the embodiments disclosed herein to address this challenge may be using objects attributes, objects poses, task information, 3D scene representation, and current human pose as these data may provide a comprehensive understanding of the current state of the task in the environment, thereby further providing a basis for a more accurate prediction of what a human may do next given the current state.

Certain embodiments disclosed herein may provide one or more technical advantages. A technical advantage of the embodiments may include improving safety of operations by robots when collaborating with human as the robotic system 100 may plan movement trajectories and tasks in a way that minimizes robot-human interference. Another technical advantage of the embodiments may include improving efficiency of task execution for the robotic system 100 as adaptive task timing may enable robots to make optimal use of time and resources when collaborating with human. Certain embodiments disclosed herein may provide none, some, or all of the above technical advantages. One or more other technical advantages may be readily apparent to one skilled in the art in view of the figures, descriptions, and claims of the present disclosure.

In particular embodiments, the robotic system 100 may determine, for a task to be executed by the robotic system 100, one or more objects and one or more actions associated with the one or more objects for completing the task. Each action may be associated with trajectory. In particular embodiments, the robotic system 100 may determine, for each of one or more people in an environment associated with the robotic system 100, a pose of the respective person. The robotic system 100 may then predict, for each of the one or more people, a trajectory of the respective person. In particular embodiments, the predicted trajectory for each person may be based on the determined pose associated with the respective person and the actions and trajectories associated with the actions. The robotic system 100 may further adjust, based on the predicted trajectories for each of the people, one or more trajectories for one or more of the actions to be performed by the robotic system 100.

Figure 2:
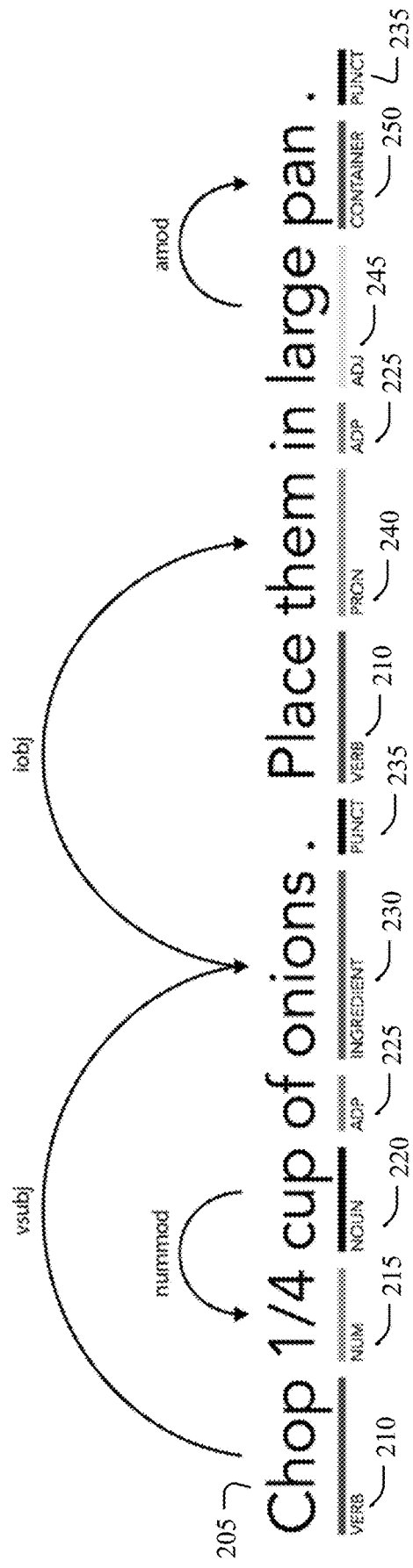
FIG. 2 illustrates an example recipe parsing based on natural language processing (NLP).
Figure 3:
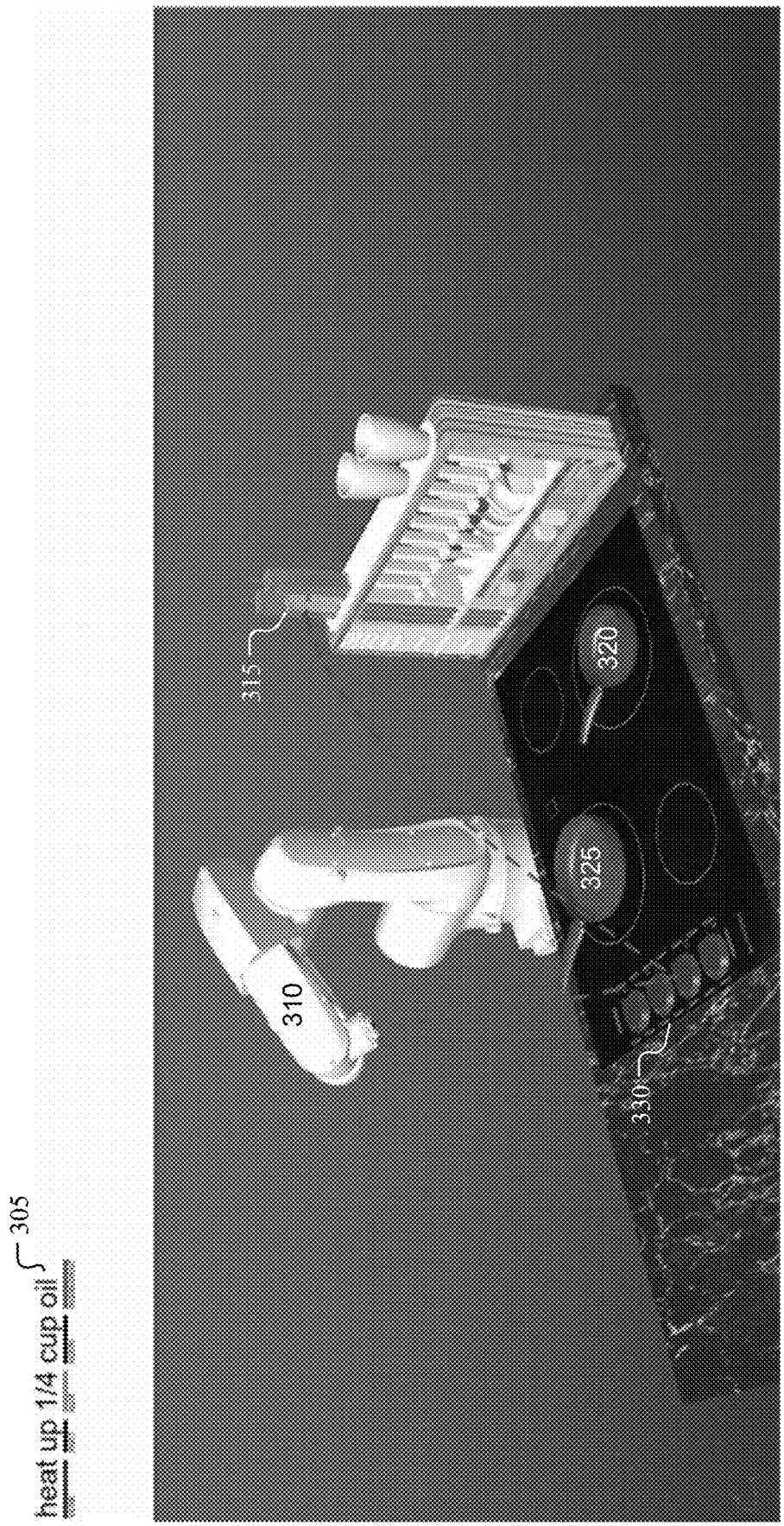
FIG. 3 illustrates an example task understanding.

In particular embodiments, the robotic system 100 may first perform task understanding. To better anticipate future human actions, the robotic system 100 may need knowledge of current and future tasks. As an example and not by way of limitation, a recipe in a cooking task that is known to the robot system 100 may provide the robotic system 100 with multiple clues that are helpful for making better predictions. For example, the robotic system 100 may identify tools and objects that will be used, e.g., pour oil into a skillet. The robotic system 100 may also determine ingredients, measures, and preparation steps. In addition, the robotic system 100 may estimate the time to complete a task. FIG. 2 illustrates an example recipe parsing based on natural language processing (NLP). In particular embodiments, a recipe may be "pre-tagged" with necessary machine-readable information, or information that can be inferred by parsing arbitrary recipes via natural language understanding algorithms. As illustrated in FIG. 2, a recipe may be "chop the ¼ cup of onions" and "place them in a large pan. 205" Using NLP, the robotic system 100 may determine verb 210, number 215, noun 220, adposition 225, ingredient 230, punctuation 235, pronoun 240, adjective 245, and container 250 from the recipe 205. FIG. 3 illustrates an example task understanding. As illustrated in FIG. 3, the task may be "heat up ¼ cup oil. 305" Based on task understanding, the robotic system 100 may instruct the robotic arm 310 to fetch oil 315, pour it in the small pan 320 or the large pan 325, and turn on the stove with one of the stove turners 330. Although this disclosure describes particular task understanding by particular systems in a particular manner, this disclosure contemplates any suitable task understanding by any suitable system in any suitable manner.

Figure 4:
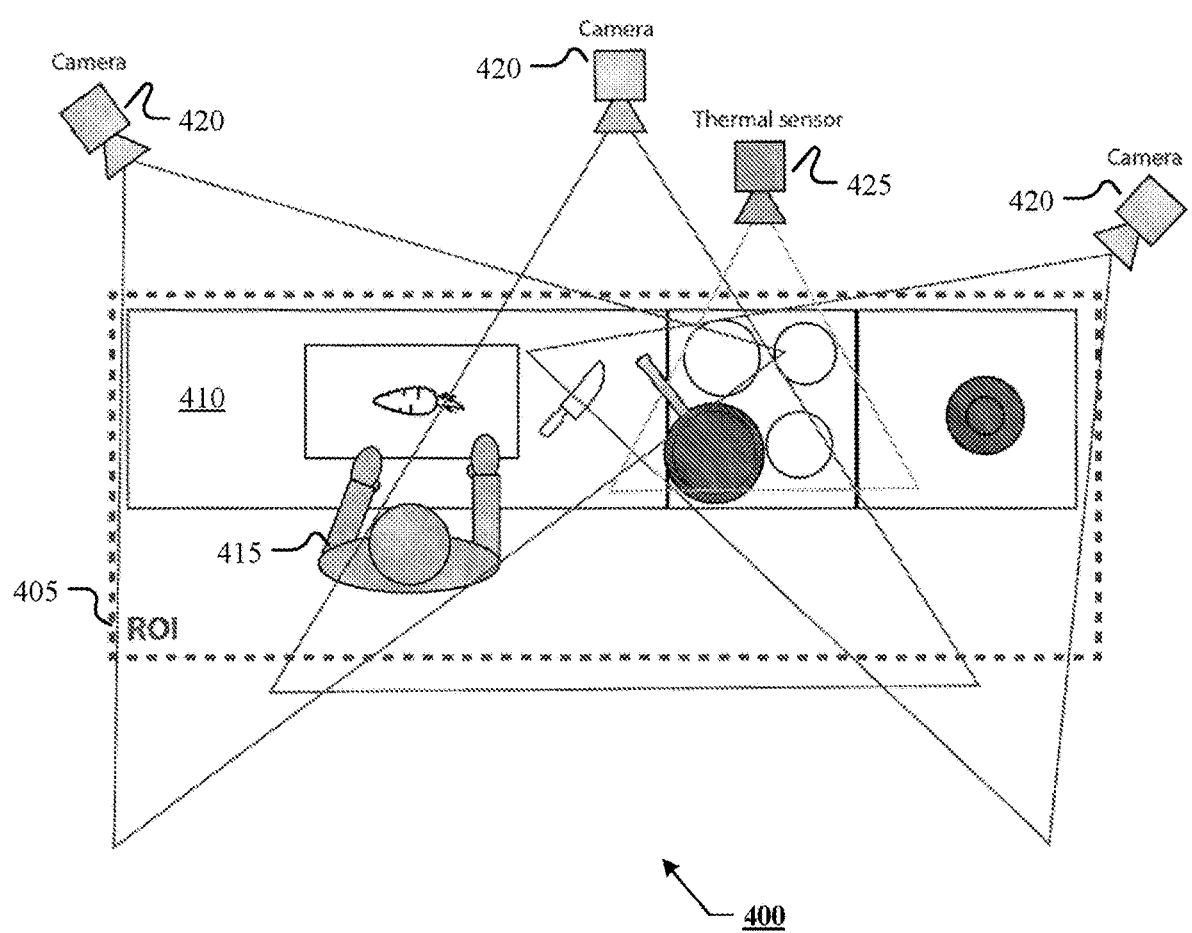
FIG. 4 illustrates an example multimodal sensor setup.

FIG. 4 illustrates an example multimodal sensor setup 400. In particular embodiments, the robotic system 100 may use sensor data captured by multimodal sensors for task-based extrapolation for robot-human collision avoidance. As illustrated in FIG. 4, the multimodal sensors may cover a large region of interest (ROI) 405 (i.e., the rectangular area within the dashed line). The more the robotic system 100 is able to see/sense the environment, the more accurate the prediction of human actions may be. In particular embodiments, the multimodal sensor setup may offer the possibility to create a full three-dimensional (3D) scene representation of workspace and the sphere of influence of the robotic system. As an example and not by way of limitation, the 3D scene representation may be a point cloud, a plurality of voxels, etc. Additionally, the sensors may need to show the space the human is expected to move around in during the collaboration task. As an example and not by way of limitation, the ROI 405 may comprise a kitchen workspace 410 and beyond, in which there may be a person 415 and relevant cooking materials and utensils. The multimodal sensor may be a camera 420, a thermal sensor 425, a microphone, or any suitable sensor. As an example and not by way of limitation, the camera 420 may be based on RGB signal or kinetic signal. These different types of sensors may be helpful for collecting even more data about the environment. Although this disclosure describes particular sensor setup in a particular manner, this disclosure contemplates any suitable sensor setup in any suitable manner.

In particular embodiments, the robotic system 100 may perform human pose estimation (e.g., how is a human moving) to determine the pose of each person in the environment based on sensor data captured by the multimodal sensors. As an example and not by way of limitation, human pose estimation may be based on RGB data captured by RGB cameras. Such data may be fed to a neural network, which estimates the human poses. The human pose may comprise human joint estimations, which may be combined with other data for later usage of predicting future human motions. Although this disclosure describes particular pose estimation by particular systems in a particular manner, this disclosure contemplates any suitable pose estimation by any suitable system in any suitable manner.

In particular embodiments, the robotic system 100 may perform object detection (what objects are present in the environment), object segmentation, object localization, and object tracking (where are the objects) based on sensor data captured by the multimodal sensors. The more objects are recognized, the more the robotic system 100 may anticipate the task and thus human action and movement. In particular embodiments, objects that are not in the field of view of the sensors may be remembered from previous data. As an example and not by way of limitation, a person bent down at the first cabinet with a small pot in hand previously may indicate that the small pot is likely in the first cabinet). Although this disclosure describes particular object detection by particular systems in a particular manner, this disclosure contemplates any suitable object detection by any suitable system in any suitable manner.

Figure 5:
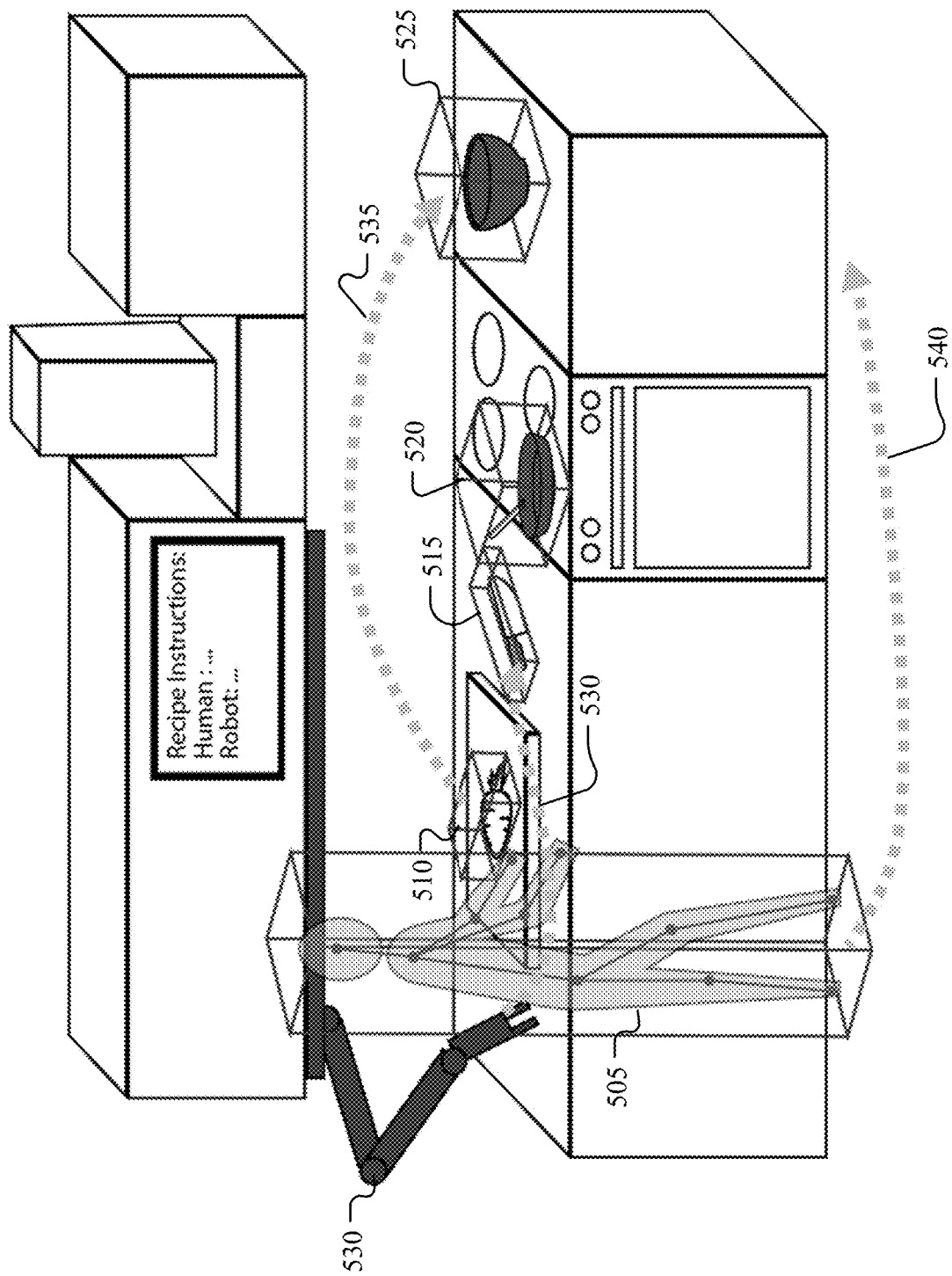
FIG. 5 illustrates an example scene data tracking in a kitchen.

FIG. 5 illustrates an example scene data tracking in a kitchen. As illustrated in FIG. 5, based on the scene data, the robotic system 100 may identify the human 505, the carrot 510, the knife 515, the pan 520, and the bowl 525. Responsive to the task, the robot arm 530 may need to fetch the knife 515, which forms the trajectory 530. The robot arm 530 may also need to put the carrot 510 into the bowl 525, which forms the trajectory 535. The robotic system 100 may additionally determine a trajectory 540 associated with the human 505. Although this disclosure describes particular scene data tracking in a particular manner, this disclosure contemplates any suitable scene data tracking in any suitable manner.

In particular embodiments, the robotic system 100 may determine, for each of the one or more objects, a pose and one or more attributes of the respective object based on sensor data captured by one or more sensors associated with the robotic system 100. In particular embodiments, a pose of an object may be based on its location and orientation. In particular embodiments, attributes of objects may indicate visual qualities of the objects, such as "striped" or "spotted". In particular embodiments, the robotic system 100 may estimate a pose of an object based on attributes of the object. As an example and not by way of limitation, part segmentation of an object may provide information about where the spout of a teapot is. The attributes of the teapot may further provide information that the object can pour and needs to be at a certain angle to pour. Although this disclosure describes determining particular attributes by particular systems in a particular manner, this disclosure contemplates determining any suitable attribute by any suitable system in any suitable manner.

Based on the aforementioned data including object attributes, object poses, task information, 3D scene representation, current human pose, etc., the robotic system 100 may build, feed, and constantly update a scene graph. In particular embodiments, the robotic system 100 may generate a scene graph comprising a plurality of nodes. Each node may represent one or more of an object associated with one or more attributes, a pose of one of the one or more people, an action by one of the one or more people, or an action of the one or more actions to be performed by the robotic system. In particular embodiments, generating the scene graph may be based on one or more of an analysis of each of a plurality of tasks based on natural language understanding, human pose estimation of poses associated with the one or more people based on sensor data captured by one or more sensors associated with the robotic system 100, or object detection based on the sensor data. Using a scene graph built from object attributes, object poses, task information, 3D scene representation, and human poses may be an effective solution for addressing the technical challenge of modeling object relationships in task understanding as the scene graph may enable the robotic system 100 to keep a snapshot of the current state of the environment and allow the robotic system 100 to easily query necessary data and their relationships for future predictions. Although this disclosure describes generating particular graphs by particular systems in a particular manner, this disclosure contemplates generating any suitable graph by any suitable system in any suitable manner.

Figure 6:
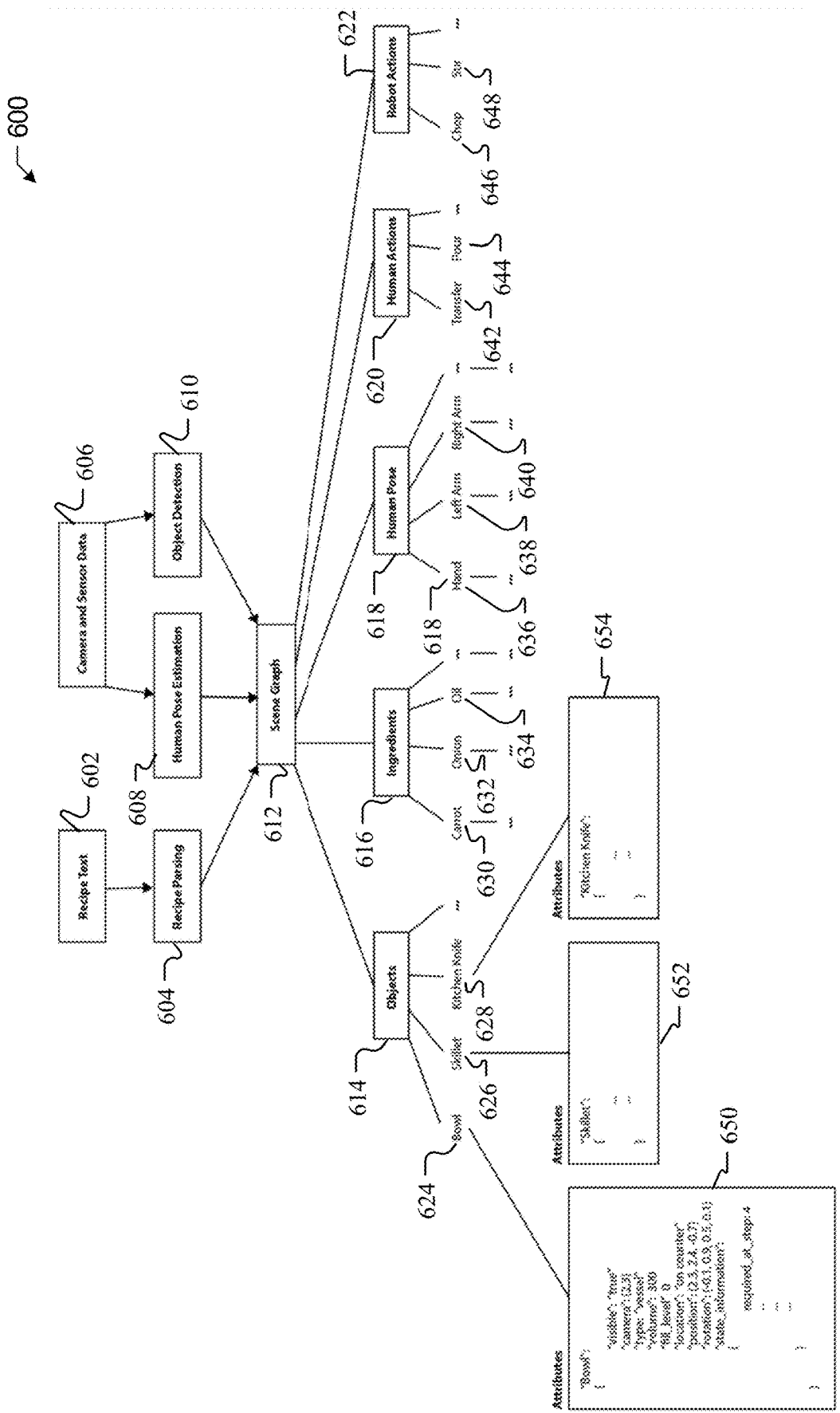
FIG. 6 illustrates an example workflow for generating a scene graph corresponding to a cooking scenario.

FIG. 6 illustrates an example workflow 600 for generating a scene graph corresponding to a cooking scenario. As illustrated in FIG. 6, based on the recipe text 602, the robotic system 100 may perform recipe parsing 604. Based on the camera and sensor data 606, the robotic system 100 may perform human pose estimation 608 and object detection 610. The results from recipe parsing 604, human pose estimation 608, and object detection 610 may be all provided to the scene graph 612. The scene graph 612 may comprise a plurality of nodes representing a plurality of general categories. As an example and not by way of limitation, each general category may be "objects" 614, "ingredients" 616, "human pose" 618, "human actions" 620, and "robot actions" 622. In particular embodiments, each node representing a general category may have a child node. As an example and not by way of limitation, the node of "objects" 614 may have child nodes representing "bowl" 624, "skillet" 626, "kitchen knife" 628, etc. As another example and not by way of limitation, the node of "ingredients" 616 may have child nodes representing "carrot" 630, "onion" 632, "oil" 634, etc. As yet another example and not by way of limitation, the node of "human pose" 618 may have child nodes representing "hand" 636, "left arm" 638, "right arm" 640, etc. As yet another example and not by way of limitation, the node of "human actions" 620 may have child nodes representing "transfer" 642, "pour" 644, etc. As yet another example and not by way of limitation, the node of "robot actions" 622 may have child nodes representing "chop" 646, "stir" 648, etc. In particular embodiments, each child node associated with "objects" 614 may further have a child node representing attributes. As an example and not by way of limitation, the nodes of "bowl" 624, "skillet" 626, and "kitchen knife" 628 may each have a child node representing the attributes of a bowl 650, the attributes of a skillet 652, and the attributes of a kitchen knife 654, respectively. Although this disclosure describes particular workflow for generating particular scene graph in a particular manner, this disclosure contemplates any suitable workflow for generating any suitable scene graph in any suitable manner.

Figure 7:
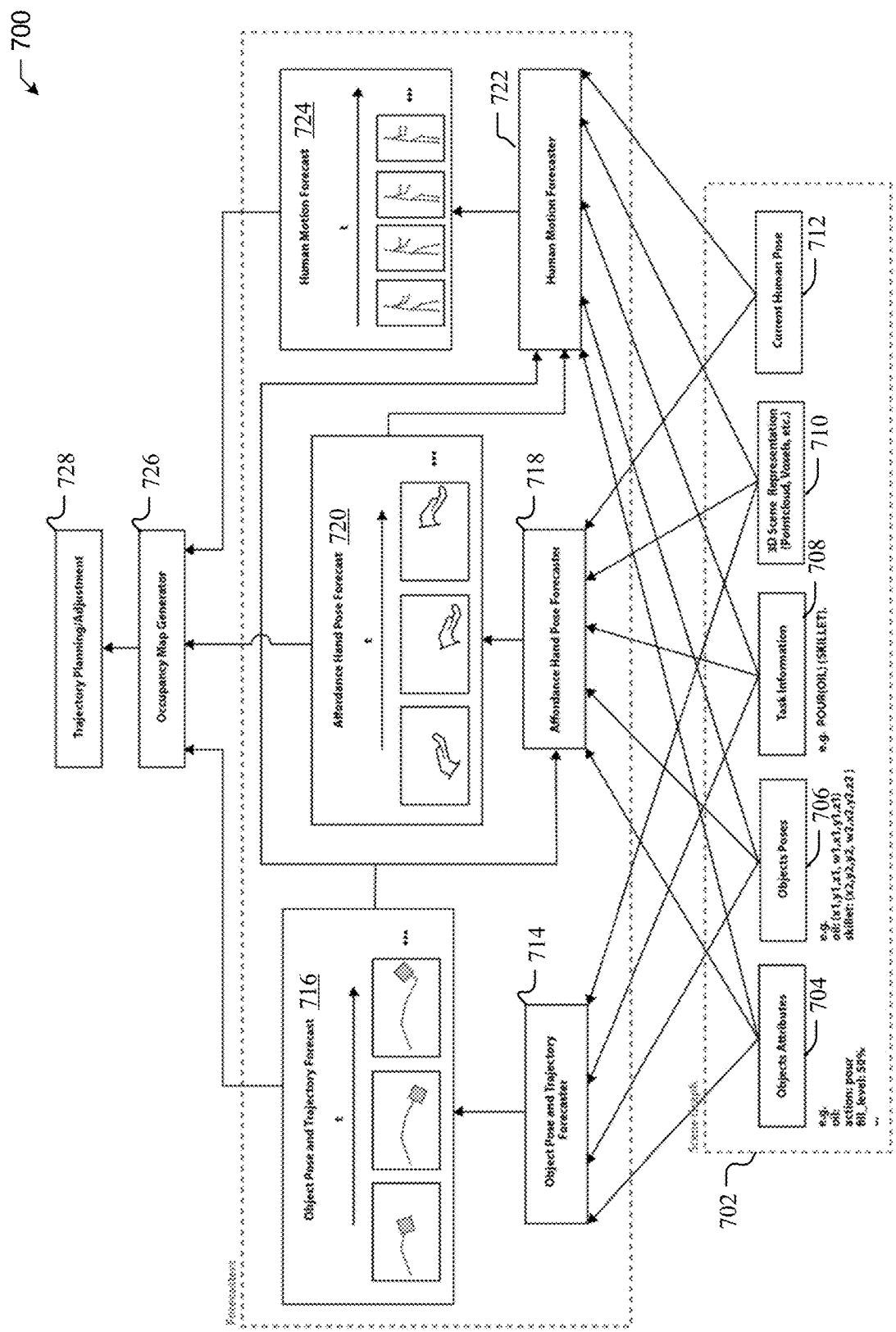
FIG. 7 illustrates an example workflow diagram for task-based extrapolation for robot-human collision avoidance.

FIG. 7 illustrates an example workflow diagram 700 for task-based extrapolation for robot-human collision avoidance. As illustrated in FIG. 7, the workflow diagram may start from the scene graph 702. The scene graph 702 may be based on objects attributes 704, objects poses 706, task information 708, three-dimensional (3D) scene representation 710, and current human pose 712. As an example and not by way of limitation, attributes 707 for oil may comprise "action: pour", "fill_level: 50%", etc. As another example and not by way of limitation, a pose 706 for oil may be represented as (x1,y1,z1,w1,x1,y1,z1) and a pose 706 for skillet may be represented as (x2,y2,w2,x2,y2,z2), in which the first three dimensions represent the location while the last four dimensions represent the orientation. As yet another example and not by way of limitation, the task information 708 for the recipe "pour oil into a skillet" may be represented as "pour(oil)(skillet)". Although this disclosure describes particular workflow for particular extrapolation for robot-human collision avoidance in a particular manner, this disclosure contemplates any suitable workflow for any suitable extrapolation for robot-human collision avoidance in any suitable manner.

In particular embodiments, objects attributes 704, objects poses 706, task information 708, and 3D scene representation 710 may be provided to an object pose and trajectory forecaster 714. The object pose and trajectory forecaster 714 may generate object pose and trajectory forecast 716, which may comprise future pose and trajectory of an object with respect to time t. In particular embodiments, the robotic system 100 may predict, based on the determined pose and attributes of each object and the actions associated with the respective object, a trajectory of the respective object. As an example and not by way of limitation, the attributes of the teapot may further provide information that the object can pour and needs to be at a certain angle to pour, which may determine part of the trajectory forecast. In particular embodiments, predicting the trajectory for each of the one or more people may be further based on the determined trajectories of one or more of the objects. Although this disclosure describes predicting particular trajectory in a particular manner, this disclosure contemplates predicting any suitable trajectory in any suitable manner.

In particular embodiments, the robotic system 100 may predict the probable trajectory of an object that a human may use by comparing a current position associated with the object to a target position associated with the object. The target position may be determined based on the task, e.g., oil on counter needs to be moved to the skillet. As an example and not by way of limitation, the trajectory may just be the shortest path between these two points over a certain time (may be a constant speed or a function of object attributes). Additionally, predicting the trajectory of each object may be further based on kinematics of a human body. In other words, the robotic system 100 may refine the object trajectory by factoring in the human body's kinematics (e.g. can a human move his/her joints to move the object along the shortest path, or do the human joint limits demand a different trajectory?). Although this disclosure describes predicting particular trajectory by particular systems in a particular manner, this disclosure contemplates predicting any suitable trajectory by any suitable system in any suitable manner.

In particular embodiments, objects attributes 704, objects poses 706, task information 708, 3D scene representation 710, and current human pose 712 may be provided to an affordance hand pose forecaster 718. The affordance hand pose forecaster 718 may generate affordance hand pose forecast 720, which may comprise a prediction of a human grasp of an object with respect to time t. The affordance hand pose forecaster 718 may further help improving human motion forecasts by taking into account human joint constraints. In particular embodiments, the robotic system 100 may predict, for each of the one or more people, a pose of a hand of the respective person based on one or more of attributes of one or more of the objects, poses of one or more of the objects, one or more of the actions, human kinematics associated with the respective person, or a three-dimensional (3D) scene representation of the environment associated with the robotic system, or the determined pose associated with the respective person. As an example and not by way of limitation, the 3D scene representation may be generated based on sensor data captured by one or more sensors associated with the robotic system 100. In particular embodiments, predicting the trajectory for each of the one or more people may be further based on the predicted pose of the hand of the respective person. Although this disclosure describes predicting particular poses in a particular manner, this disclosure contemplates predicting any suitable pose in any suitable manner.

In particular embodiments, the robotic system 100 may improve affordance hand pose prediction by deploying object part segmentation and pre-labeling most likely grasp poses. This may allow the affordance hand pose prediction to generalize across objects. Furthermore, object attributes, such as action (pour, shake, etc.) may be used to infer most likely human grasp positions. Additionally, the robotic system 100 may include human kinematics limits to further improve predicted grasp pose. As an example and not by way of limitation, if a human is constrained by countertop and left arm length, this may indicate that the human is most likely performing grasps. Although this disclosure describes using particular attributes for particular pose prediction in a particular manner, this disclosure contemplates using any suitable attribute for any suitable pose prediction in any suitable manner.

In particular embodiments, the robotic system 100 may use a plurality of affordance training data to learn machine-learning models for the affordance hand pose forecaster 718. As an example and not by way of limitation, one may use existing 3D datasets and add 3D hand models to these datasets. As another example and not by way of limitation, one may new datasets that consider affordances by using object part segmentation. Although this disclosure describes using particular data to learn particular models in a particular manner, this disclosure contemplates using any suitable data to learn any suitable model in any suitable manner.

In particular embodiments, objects attributes 704, objects poses 706, task information 708, 3D scene representation 710, and current human pose 712 may be provided to a human motion forecaster 722. The human motion forecaster 722 may generate human motion forecast 724, which may comprise a prediction of a human motion (i.e., a trajectory) with respect to time t. In particular embodiments, the human motion forecaster 722 may predict the trajectory for each of the one or more people further based on one or more machine-learning models. As an example and not by way of limitation, each machine-learning model may be based on one or more of a recurrent neural network model, a long-short term memory model, a deep reinforcement learning model, or any hybrid deep learning architecture that is comprised of one or more of these aforementioned models. These models can forecast one or multiple sequences of plausible data, i.e., human motion. In particular embodiments, these deep learning architectures may take many different parameters as input and very precisely approximate the behavior of any complex function. Using objects attributes, objects poses, task information, 3D scene representation, and current human pose may be an effective solution for addressing the technical challenge of effectively predicting human motion as these data may provide a comprehensive understanding of the current state of the task in the environment, thereby further providing a basis for a more accurate prediction of what a human may do next given the current state. Although this disclosure describes predicting particular motions in a particular manner, this disclosure contemplates predicting any suitable motion in any suitable manner.

In particular embodiments, the human motion forecaster 722 may use a plurality of motion training data for learning the machine-learning models. Motion data may comprise motion capture data (e.g., cut, chop, pour, transfer, etc. in a kitchen environment). As the quality and amount of training data may determine the success of a machine-learning model, the human motion forecaster 722 may augment the motion training data in various ways. As an example and not by way of limitation, the augmentation may be based on stretching/shortening motion sequence, changing joint angles in a certain range, blending with other similar motion sequences, adding noise etc. To further improve the models, the human motion forecaster 722 may decide to capture motion data on the fly with the robotic system already being deployed. Although this disclosure describes using particular data for learning particular models in a particular manner, this disclosure contemplates using any suitable data for learning any suitable model in any suitable manner.

Figure 8:
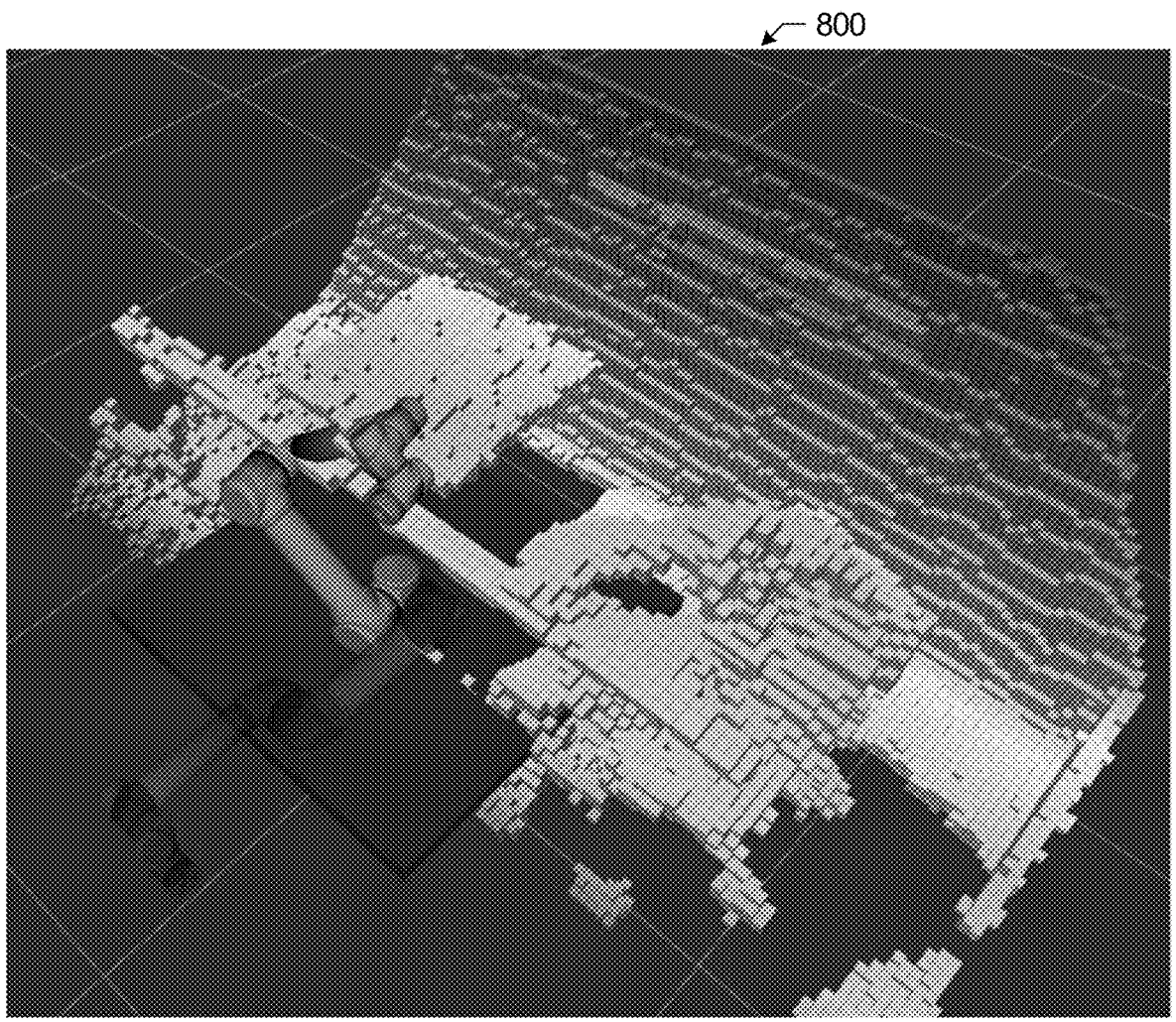
FIG. 8 illustrates an example occupancy map.

FIG. 8 illustrates an example occupancy map 800. In particular embodiments, the robotic system 100 may generate an occupancy map comprising a sequence of three-dimensional (3D) volumes. The occupancy map may show regions to avoid. Occupancy voxel (i.e., the 3D volume) may represent occupancy by people and/or objects. In particular embodiments, each 3D volume may be associated with a weight indicating a probability that the corresponding 3D volume is likely to be occupied by one or more of one of the one or more people or one of the one or more objects. As illustrated in FIG. 8, the darker the volume is, the higher probability that the corresponding 3D volume is likely to be occupied by a person or an object. In particular embodiments, adjusting the one or more trajectories may be further based on the occupancy map. As illustrated in FIG. 7, the object pose and trajectory forecast 716, the affordance hand pose forecast 720, and the human motion forecast 724 may be provided to an occupancy map generator 726. The occupancy map generator 726 may create occupancy maps that indicate to a trajectory planning/adjustment module 728 where the robot should not move to. The occupancy map may comprise a sequence of volumes (e.g. a point cloud or voxels). This 3D geometry may define the future area the robot should try to avoid over a given time. This 3D volume may be often times called an occupancy map. In particular embodiments, the voxels of the occupancy map may also be weighted signifying the probability that a certain 3D volume will be occupied, given the trajectory planning/adjustment module 728 additional parameters. Although this disclosure describes particular occupancy maps in a particular manner, this disclosure contemplates any suitable occupancy map in any suitable manner.

After generating the occupancy map, the trajectory planning/adjustment module 728 may use different existing trajectory planning algorithms to figure out the best path that would avoid the volume that is defined by the occupancy map. Depending on the trajectory plan, the trajectory planning/adjustment module 728 may decide to delay or reschedule a task once the forecaster shows a "window of opportunity" (e.g. time picking up a tool by knowledge of future human actions). After a trajectory has been planned and the robot system 100 is in motion, the pose estimation and human motion prediction may keep updating in parallel. If a potential collision is predicted, the robot system 100 may adjust the current trajectory. As a result, the robotic system 100 may have a technical advantage of improving safety of operations by robots when collaborating with human as the robotic system 100 may plan movement trajectories and tasks in a way that minimizes robot-human interference. Although this disclosure describes determining particular paths in a particular manner, this disclosure contemplates determining any suitable path in any suitable manner.

Figure 9:
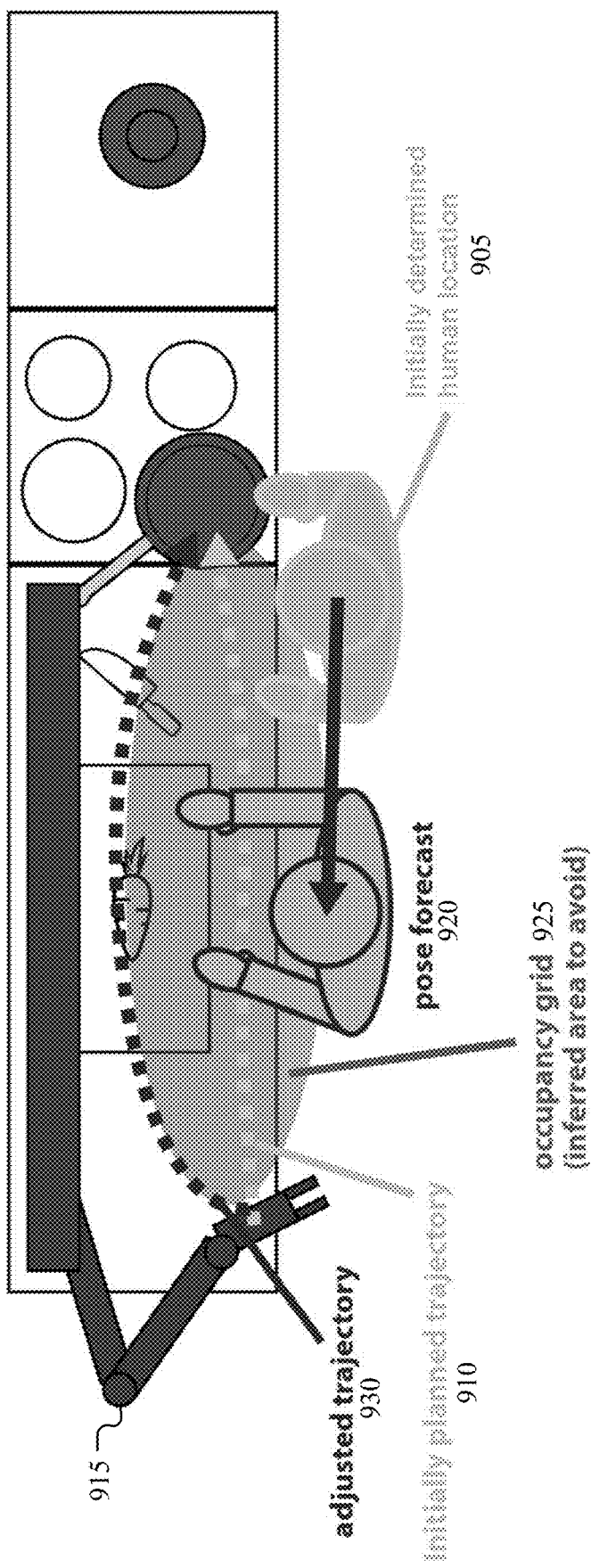
FIG. 9 illustrates an example adjustment of a trajectory.

In particular embodiments, adjusting each of the one or more trajectories may comprise one or more of adjusting a route associated with the respective trajectory, adjusting a speed associated with the respective trajectory, suspending the respective trajectory, changing the respective trajectory to a trajectory associated with another task, or alerting the one or more people about the respective trajectory. As an example and not by way of limitation, adjusting a route associated with the respective trajectory may comprise moving around the future obstacle. As another example and not by way of limitation, adjusting a speed associated with the respective trajectory may comprise moving slower to wait out the future obstacle or moving faster to outpace the future obstacle. As yet another example and not by way of limitation, suspending the respective trajectory may comprise stopping/halting motion to wait out the future obstacle. As yet another example and not by way of limitation, changing the respective trajectory to a trajectory associated with another task may comprise deciding to do another task to minimize interference. FIG. 9 illustrates an example adjustment of a trajectory. In FIG. 9, there may be an initially determined human location 905. There may be also an initially planned trajectory 910 for the robot arm 915. The robotic system 100 may have a pose forecast 920 for the human. Based on the above information, the robotic system 100 may further generate an occupancy map. The occupancy map may comprise occupancy grid 925, which indicates the inferred area to avoid. Based on the occupancy grid 925, the robotic system 100 may generate an adjusted trajectory 930 for the robot arm 915. Although this disclosure describes adjusting particular trajectories in a particular manner, this disclosure contemplates adjusting any suitable trajectory in any suitable manner.

In particular embodiments, the trajectory planning/adjustment module 728 may conduct adaptive task timing. Given the information from the forecasters and the resulting occupancy maps, the trajectory planning/adjustment module 728 may make a good guess if it is possible to execute the task without colliding with the human. If future collision is too probable trajectory planning/adjustment module 378 may "re-schedule" a task. This rescheduling may take on different forms. In particular embodiments, the robotic system 100 may halt current task and query scene graph about objects and locations in environment. If future task requires human to move out of collision zone, the robotic system 100 may delay the task being executed by the robotic system 100 (i.e., waiting for the window of opportunity). In particular embodiments, the robotic system 100 may continue with another task if possible (e.g., if recipe allows and if necessary ingredients and tools are in range). As an example and not by way of limitation, the robotic system 100 may politely ask human to move over or pass the object. Adaptive task timing may result in a technical advantage of improving efficiency of task execution for the robotic system 100 as robots may make optimal use of time and resources when collaborating with human. Although this disclosure describes particular task timing in a particular manner, this disclosure contemplates any suitable task timing in any suitable manner.

Figure 10A:
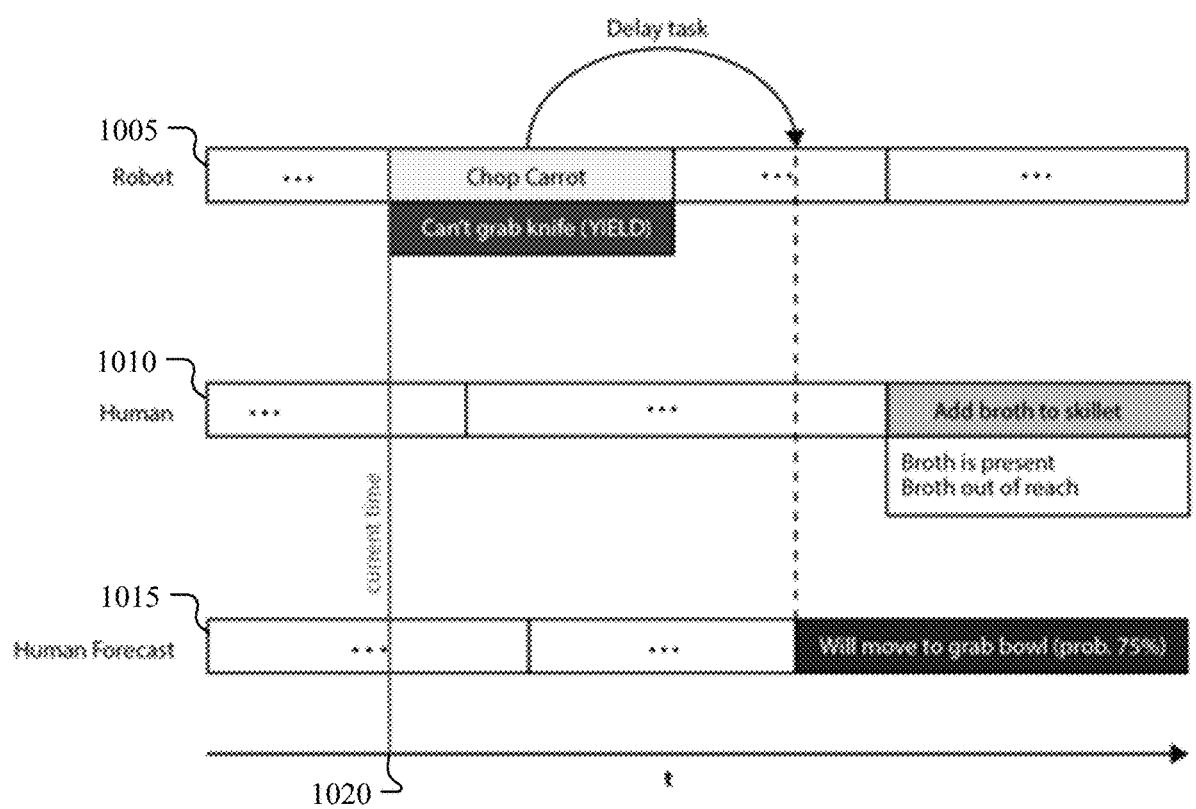
FIG. 10A illustrates an example adaptive task timing by delaying a task.
Figure 10B:
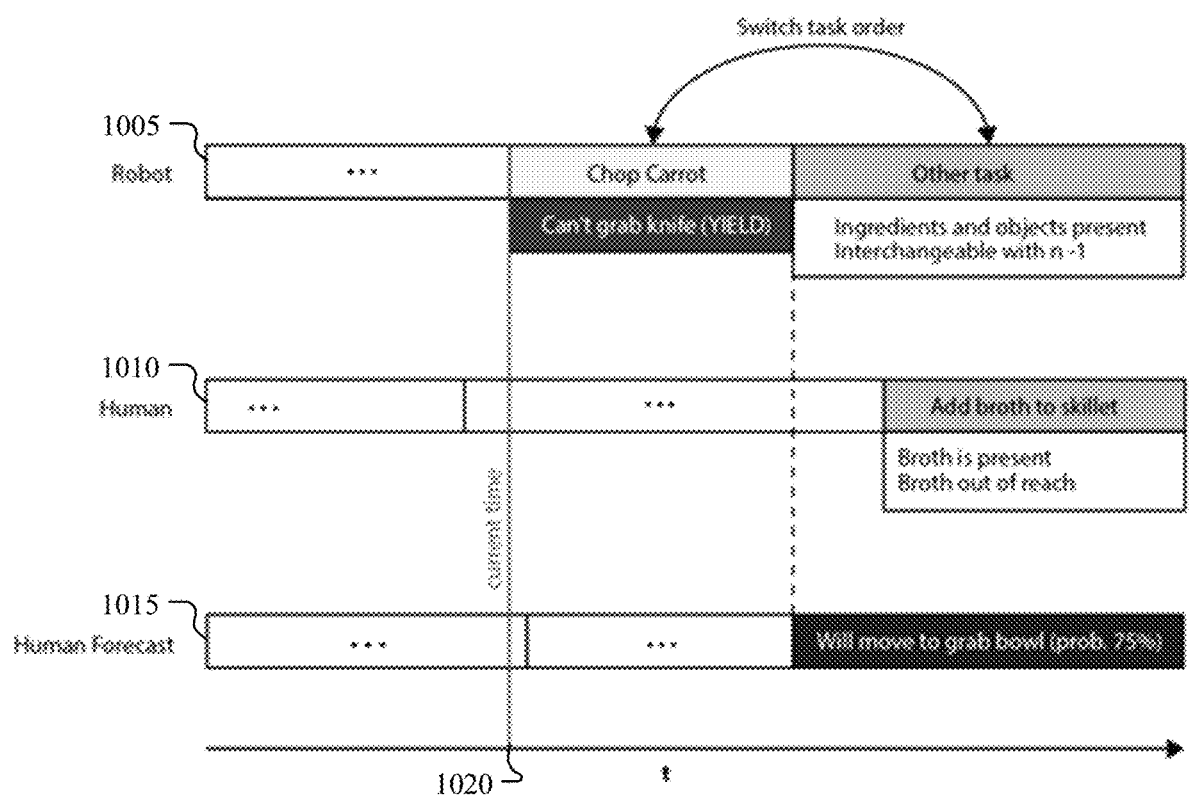
FIG. 10B illustrates an example adaptive task timing by switching the task order.

FIGS. 10A-10B illustrates example adaptive task timing. FIG. 10A illustrates an example adaptive task timing by delaying a task. In FIG. 10A, there may be a timeline 1005 for tasks to be executed by the robot and a timeline 1010 for tasks to be executed by human. In addition, there may be a human forecast 1015, predicting what the human may do in the future. At the current time 1020, the robot may need to chop carrot. However, the robotic system 100 may determine that the robot cannot grab the knife (e.g., because the human is using it) and should yield to human. The human may need to add broth to skillet in a later time, for which the human forecast 1015 may comprise a prediction that the human will move to grab bowl with a probability of 75%. As a result, the robotic system may determine to delay the task of chopping carrot until the human moves to grab bowl. FIG. 10B illustrates an example adaptive task timing by switching the task order. Similarly, there may be a timeline 1005 for tasks to be executed by the robot, a timeline 1010 for tasks to be executed by human, and a human forecast 1015. The same as illustrated in FIG. 10A, the robot cannot grab the knife at the current time 1020 for the task of chopping carrot. However, the robotic system 100 may determine that there are some other tasks that are not order dependent, e.g., the robot can execute such tasks without the need to finish chopping carrot first. As indicated in FIG. 10B, for these other tasks, ingredients and objects present may be interchangeable with those from a previous task (denoted by n−1). As a result, the robotic system 100 may determine to switch to the task order by executing one of these task before chopping carrot.

Figure 11:
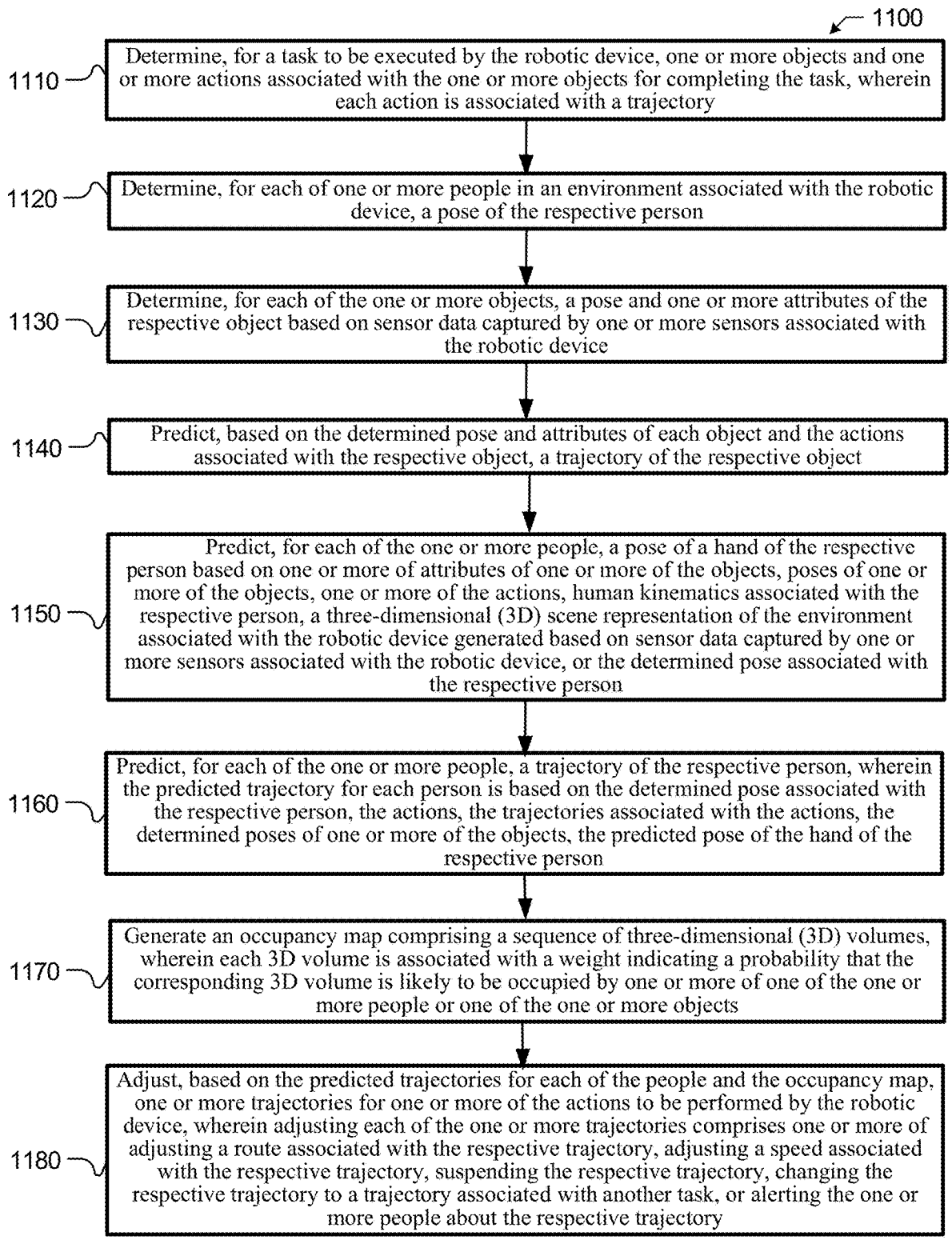
FIG. 11 is a flow diagram of a method for task-based extrapolation for robot-human collision avoidance, in accordance with the presently disclosed embodiments.

FIG. 11 illustrates is a flow diagram of a method for task-based extrapolation for robot-human collision avoidance, in accordance with the presently disclosed embodiments. The method 1100 may be performed utilizing one or more processing devices (e.g., a robotic system 100) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D and 3D image data, software (e.g., instructions running/executing on one or more processors), firmware (e.g., microcode), or some combination thereof.

The method 1100 may begin at step 1110 with the one or more processing devices (e.g., the robotic system 100). For example, in particular embodiments, the robotic system 100 may determine, for a task to be executed by the robotic system 100, one or more objects and one or more actions associated with the one or more objects for completing the task, wherein each action is associated with a trajectory. The method 1100 may then continue at step 1120 with the one or more processing devices (e.g., the robotic system 100). For example, in particular embodiments, the robotic system 100 may determine, for each of one or more people in an environment associated with the robotic system, a pose of the respective person. The method 1100 may then continue at step 1130 with the one or more processing devices (e.g., the robotic system 100). For example, in particular embodiments, the robotic system 100 may determine, for each of the one or more objects, a pose and one or more attributes of the respective object based on sensor data captured by one or more sensors associated with the robotic system 100. The method 1100 may then continue at step 1140 with the one or more processing devices (e.g., the robotic system 100). For example, in particular embodiments, the robotic system 100 may predict, based on the determined pose and attributes of each object and the actions associated with the respective object, a trajectory of the respective object. The method 1100 may then continue at step 1150 with the one or more processing devices (e.g., the robotic system 100). For example, in particular embodiments, the robotic system 100 may predict, for each of the one or more people, a pose of a hand of the respective person based on one or more of attributes of one or more of the objects, poses of one or more of the objects, one or more of the actions, human kinematics associated with the respective person, a three-dimensional (3D) scene representation of the environment associated with the robotic system 100 generated based on sensor data captured by one or more sensors associated with the robotic system, or the determined pose associated with the respective person. The method 1100 may then continue at step 1160 with the one or more processing devices (e.g., the robotic system 100). For example, in particular embodiments, the robotic system 100 may predict, for each of the one or more people, a trajectory of the respective person, wherein the predicted trajectory for each person is based on the determined pose associated with the respective person, the actions, the trajectories associated with the actions, the determined poses of one or more of the objects, the predicted pose of the hand of the respective person. The method 1100 may then continue at step 1170 with the one or more processing devices (e.g., the robotic system 100). For example, in particular embodiments, the robotic system 100 may generate an occupancy map comprising a sequence of three-dimensional (3D) volumes, wherein each 3D volume is associated with a weight indicating a probability that the corresponding 3D volume is likely to be occupied by one of the one or more people. The method 1100 may then continue at step 1180 with the one or more processing devices (e.g., the robotic system 100). For example, in particular embodiments, the robotic system 100 may adjust, based on the predicted trajectories for each of the people and the occupancy map, one or more trajectories for one or more of the actions to be performed by the robotic system, wherein adjusting each of the one or more trajectories comprises one or more of adjusting a route associated with the respective trajectory, adjusting a speed associated with the respective trajectory, suspending the respective trajectory, changing the respective trajectory to a trajectory associated with another task, or alerting the one or more people about the respective trajectory. Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for task-based extrapolation for robot-human collision avoidance including the particular steps of the method of FIG. 11, this disclosure contemplates any suitable method for task-based extrapolation for robot-human collision avoidance including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Systems and Methods

Figure 12:
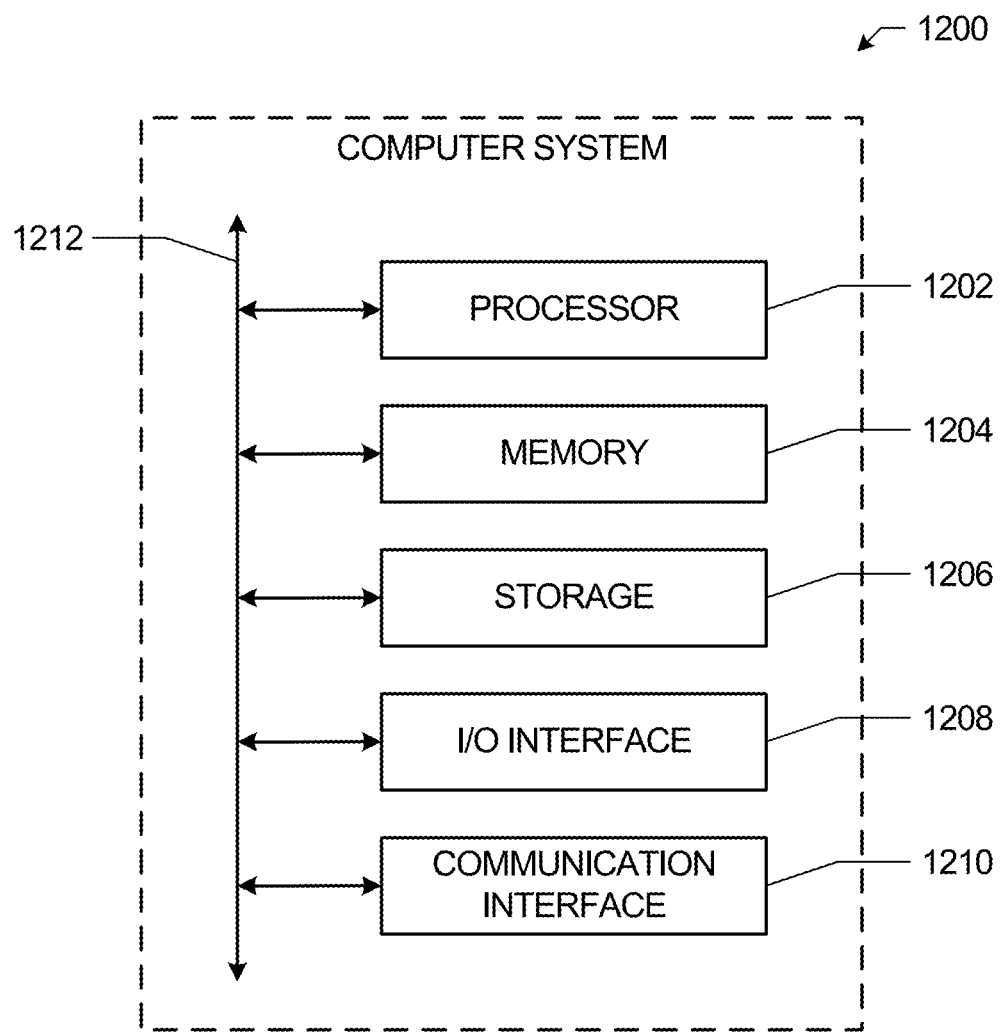
FIG. 12 illustrates an example computer system.

FIG. 12 illustrates an example computer system 1200 that may be utilized to perform task-based extrapolation for robot-human collision avoidance, in accordance with the presently disclosed embodiments. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks.

Where appropriate, one or more computer systems 1200 may perform without substantial spatial or temporal limitation one or more steps of one or more methods described or illustrated herein. As an example, and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement. In particular embodiments, processor 1202 includes hardware for executing instructions, such as those making up a computer program. As an example, and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example, and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202.

Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example, and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere).

One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memory devices 1204, where appropriate. Although this disclosure describes and illustrates particular memory, this disclosure contemplates any suitable memory.

In particular embodiments, storage 1206 includes mass storage for data or instructions. As an example, and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1206 for them. Where appropriate, I/O interface 1208 may include one or more device or software drivers enabling processor 1202 to drive one or more of these I/O devices. I/O interface 1208 may include one or more I/O interfaces 1206, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it.

As an example, and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example, and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

AI Architecture

Figure 13:
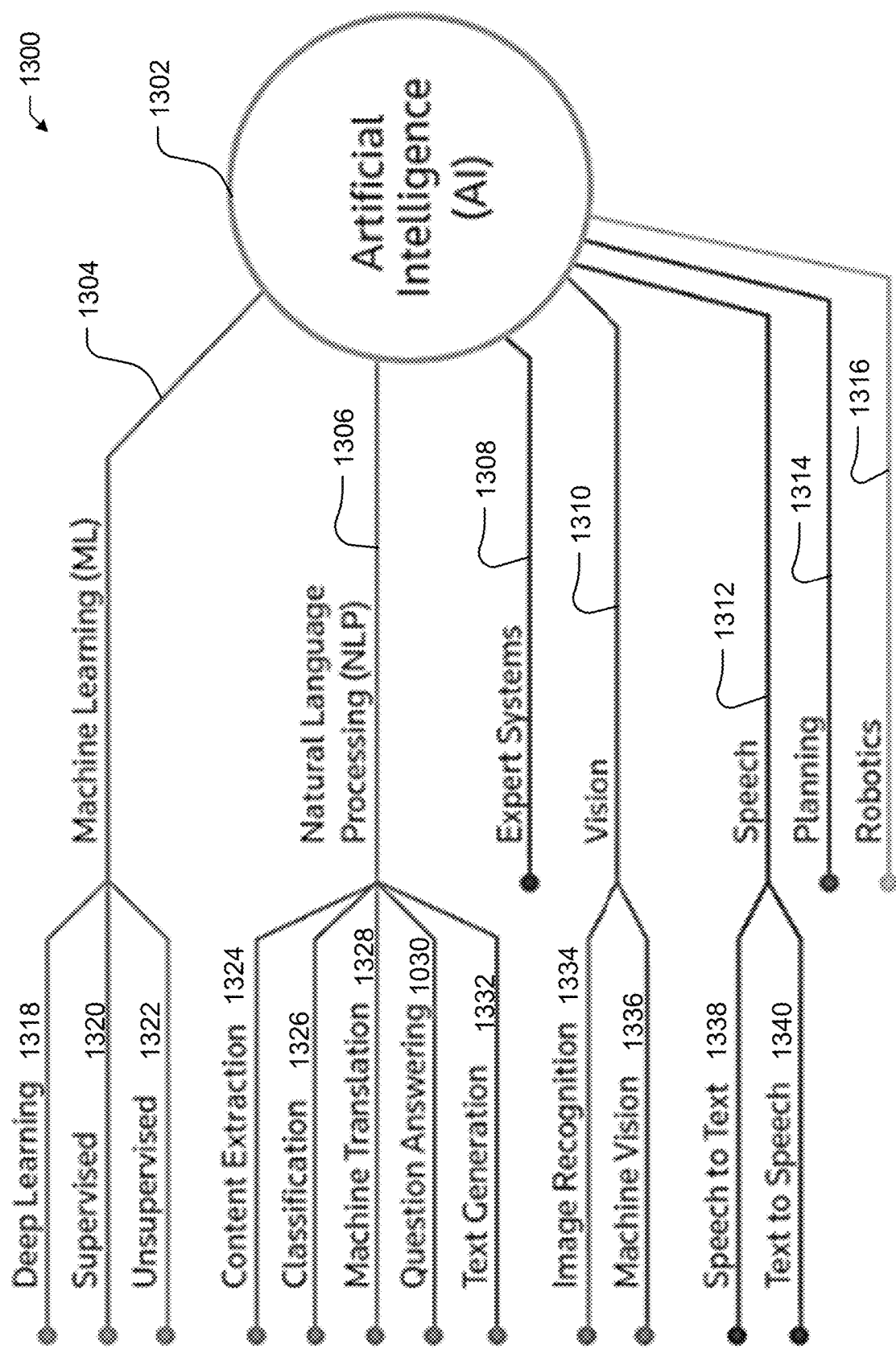
FIG. 13 illustrates a diagram of an example artificial intelligence (AI) architecture.

FIG. 13 illustrates a diagram 1300 of an example artificial intelligence (AI) architecture 1302 that may be utilized to perform task-based extrapolation for robot-human collision avoidance, in accordance with the presently disclosed embodiments. In particular embodiments, the AI architecture 1302 may be implemented utilizing, for example, one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various data and making one or more decisions based thereon), software (e.g., instructions running/executing on one or more processing devices), firmware (e.g., microcode), or some combination thereof.

In particular embodiments, as depicted by FIG. 13, the AI architecture 1302 may include machine leaning (ML) algorithms and functions 1304, natural language processing (NLP) algorithms and functions 1306, expert systems 1308, computer-based vision algorithms and functions 1310, speech recognition algorithms and functions 1312, planning algorithms and functions 1314, and robotics algorithms and functions 1316. In particular embodiments, the ML algorithms and functions 1304 may include any statistics-based algorithms that may be suitable for finding patterns across large amounts of data (e.g., "Big Data" such as user click data or other user interactions, text data, image data, video data, audio data, speech data, numbers data, and so forth). For example, in particular embodiments, the ML algorithms and functions 1304 may include deep learning algorithms 1318, supervised learning algorithms 1320, and unsupervised learning algorithms 1322.

In particular embodiments, the deep learning algorithms 1318 may include any artificial neural networks (ANNs) that may be utilized to learn deep levels of representations and abstractions from large amounts of data. For example, the deep learning algorithms 1318 may include ANNs, such as a multilayer perceptron (MLP), an autoencoder (AE), a convolution neural network (CNN), a recurrent neural network (RNN), long short term memory (LSTM), a grated recurrent unit (GRU), a restricted Boltzmann Machine (RBM), a deep belief network (DBN), a bidirectional recurrent deep neural network (BRDNN), a generative adversarial network (GAN), and deep Q-networks, a neural autoregressive distribution estimation (NADE), an adversarial network (AN), attentional models (AM), deep reinforcement learning, and so forth.

In particular embodiments, the supervised learning algorithms 1320 may include any algorithms that may be utilized to apply, for example, what has been learned in the past to new data using labeled examples for predicting future events. For example, starting from the analysis of a known training dataset, the supervised learning algorithms 1320 may produce an inferred function to make predictions about the output values. The supervised learning algorithms 1320 can also compare its output with the correct and intended output and find errors in order to modify the supervised learning algorithms 1320 accordingly. On the other hand, the unsupervised learning algorithms 1322 may include any algorithms that may applied, for example, when the data used to train the unsupervised learning algorithms 1322 are neither classified or labeled. For example, the unsupervised learning algorithms 1322 may study and analyze how systems may infer a function to describe a hidden structure from unlabeled data.

In particular embodiments, the NLP algorithms and functions 1306 may include any algorithms or functions that may be suitable for automatically manipulating natural language, such as speech and/or text. For example, in particular embodiments, the NLP algorithms and functions 1306 may include content extraction algorithms or functions 1324, classification algorithms or functions 1326, machine translation algorithms or functions 1328, question answering (QA) algorithms or functions 1330, and text generation algorithms or functions 1332. In particular embodiments, the content extraction algorithms or functions 1324 may include a means for extracting text or images from electronic documents (e.g., webpages, text editor documents, and so forth) to be utilized, for example, in other applications.

In particular embodiments, the classification algorithms or functions 1326 may include any algorithms that may utilize a supervised learning model (e.g., logistic regression, naïve Bayes, stochastic gradient descent (SGD), k-nearest neighbors, decision trees, random forests, support vector machine (SVM), and so forth) to learn from the data input to the supervised learning model and to make new observations or classifications based thereon. The machine translation algorithms or functions 1328 may include any algorithms or functions that may be suitable for automatically converting source text in one language, for example, into text in another language. The QA algorithms or functions 1330 may include any algorithms or functions that may be suitable for automatically answering questions posed by humans in, for example, a natural language, such as that performed by voice-controlled personal assistant devices. The text generation algorithms or functions 1332 may include any algorithms or functions that may be suitable for automatically generating natural language texts.

In particular embodiments, the expert systems 1308 may include any algorithms or functions that may be suitable for simulating the judgment and behavior of a human or an organization that has expert knowledge and experience in a particular field (e.g., stock trading, medicine, sports statistics, and so forth). The computer-based vision algorithms and functions 1310 may include any algorithms or functions that may be suitable for automatically extracting information from images (e.g., photo images, video images). For example, the computer-based vision algorithms and functions 1310 may include image recognition algorithms 1334 and machine vision algorithms 1336. The image recognition algorithms 1334 may include any algorithms that may be suitable for automatically identifying and/or classifying objects, places, people, and so forth that may be included in, for example, one or more image frames or other displayed data. The machine vision algorithms 1336 may include any algorithms that may be suitable for allowing computers to "see", or, for example, to rely on image sensors cameras with specialized optics to acquire images for processing, analyzing, and/or measuring various data characteristics for decision making purposes.

In particular embodiments, the speech recognition algorithms and functions 1312 may include any algorithms or functions that may be suitable for recognizing and translating spoken language into text, such as through automatic speech recognition (ASR), computer speech recognition, speech-to-text (STT), or text-to-speech (TTS) in order for the computing to communicate via speech with one or more users, for example. In particular embodiments, the planning algorithms and functions 1338 may include any algorithms or functions that may be suitable for generating a sequence of actions, in which each action may include its own set of preconditions to be satisfied before performing the action. Examples of AI planning may include classical planning, reduction to other problems, temporal planning, probabilistic planning, preference-based planning, conditional planning, and so forth. Lastly, the robotics algorithms and functions 1340 may include any algorithms, functions, or systems that may enable one or more devices to replicate human behavior through, for example, motions, gestures, performance tasks, decision-making, emotions, and so forth.

Herein, a computer-readable non-transitory storage medium or media may include one or more semiconductorbased or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a robotic system:
   determining, for a task to be executed at least in part by the robotic system, one or more objects and one or more actions associated with the one or more objects for completing the task, wherein each action is associated with a trajectory;
   determining, for each of one or more people in an environment associated with the robotic system, a pose of the respective person;
   predicting, for each of the one or more people and based on the determined pose associated with the respective person, a three-dimensional, bounded trajectory volume comprising a plurality of 3D volumes for the respective person, wherein each 3D volume of the predicted trajectory volume for each person is associated with a predicted probability that the respective person or an action of the respective person will occupy that 3D volume during a particular timeframe; and
   determining whether one or more trajectories associated with one or more actions of the robotic system passes through the trajectory volume during the particular timeframe; and
      in response to a determination that one or more trajectories associated with one or more actions of the robotic system passes through the trajectory volume during the particular timeframe, then adjusting the one or more trajectories associated with one or more actions of the robotic system; and
      in response to a determination that one or more trajectories associated with one or more actions of the robotic system does not pass through the trajectory volume in the particular timeframe, then leaving the one or more trajectories associated with one or more actions of the robotic system unchanged.

2. The method of claim 1, further comprising:
   determining, for each of the one or more objects, a pose and one or more attributes of the respective object based on sensor data captured by one or more sensors associated with the robotic system.

3. The method of claim 2, wherein the three-dimensional trajectory volume is further predicted based on the pose and or more attributes of at least one of the one or more objects.

4. The method of claim 1, further comprising:
   predicting, for each of the one or more people, a pose of a hand of the respective person based on one or more of:
      attributes of one or more of the objects;
      poses of one or more of the objects;
      one or more of the actions;
      human kinematics associated with the respective person;
      a three-dimensional (3D) scene representation of the environment associated with the robotic system, wherein the 3D scene representation is generated based on sensor data captured by one or more sensors associated with the robotic system; or the determined pose associated with the respective person, wherein predicting the three-dimensional trajectory volume for each of the one or more people is further based on the predicted pose of the hand of the respective person.

5. The method of claim 1, wherein each 3D volume comprises a voxel.

6. The method of claim 1, wherein adjusting the one or more trajectories associated with one or more actions of the robotic system comprises one or more of:

adjusting a route associated with at least one of the one or more trajectories;

adjusting a speed associated with at least one of the one or more trajectories;

suspending at least one of the one or more trajectories;

changing at least one of the one or more trajectories to a trajectory associated with another task; or alerting the one or more people about at least one of the one or more trajectories.

7. The method of claim 1, further comprising:

generating a scene graph comprising a plurality of nodes, wherein each node represents one or more of:

an object associated with one or more attributes;

a pose of one of the one or more people;

an action by one of the one or more people; or an action of the one or more actions to be performed by the robotic system, and wherein generating the scene graph is based on one or more of:

an analysis of each of a plurality of tasks based on natural language understanding;

human pose estimation of poses associated with the one or more people based on sensor data captured by one or more sensors associated with the robotic system; or object detection based on the sensor data.

8. A robotic system comprising:

a computing system with control software;

a robot controller;

one or more robotic limbs;

one or more non-transitory computer-readable storage media including instructions; and one or more processors coupled to the storage media, the one or more processors configured to execute the instructions to:

determine, for a task to be executed at least in part by the robotic system, one or more objects and one or more actions associated with the one or more objects for completing the task, wherein each action is associated with a trajectory;

determine, for each of one or more people in an environment associated with the robotic system, a pose of the respective person;

predict, for each of the one or more people and based on the determined pose associated with the respective person, a three-dimensional, bounded trajectory volume comprising a plurality of 3D volumes for the respective person, wherein each 3D volume of the predicted trajectory volume for each person is associated with a predicted probability that the respective person or an action of the respective person will occupy that 3D volume during a particular timeframe; and determine whether one or more trajectories associated with one or more actions of the robotic system passes through the trajectory volume during the particular timeframe; and in response to a determination that one or more trajectories associated with one or more actions of the robotic system passes through the trajectory volume during the particular timeframe, then adjust the one or more trajectories associated with one or more actions of the robotic system; and in response to a determination that one or more trajectories associated with one or more actions of the robotic system does not pass through the trajectory volume in the particular timeframe, then leave the one or more trajectories associated with one or more actions of the robotic system unchanged.

9. The robotic system of claim 8, wherein the processors are further configured to execute the instructions to:

determine, for each of the one or more objects, a pose and one or more attributes of the respective object based on sensor data captured by one or more sensors associated with the robotic system.

10. The robotic system of claim 9, wherein the three-dimensional trajectory volume is further predicted based on the pose and or more attributes of at least one of the one or more objects.

11. The robotic system of claim 8, wherein the processors are further configured to execute the instructions to:

predict, for each of the one or more people, a pose of a hand of the respective person based on one or more of:

attributes of one or more of the objects;

poses of one or more of the objects;

one or more of the actions;

human kinematics associated with the respective person;

a three-dimensional (3D) scene representation of the environment associated with the robotic system, wherein the 3D scene representation is generated based on sensor data captured by one or more sensors associated with the robotic system; or the determined pose associated with the respective person, wherein predicting the three-dimensional trajectory volume for each of the one or more people is further based on the predicted pose of the hand of the respective person.

12. The robotic system of claim 8, wherein each 3D volume comprises a voxel.

13. The robotic system of claim 8, wherein adjusting the one or more trajectories associated with one or more actions of the robotic system comprises one or more of:

adjusting a route associated with at least one of the one or more trajectories;

adjusting a speed associated with at least one of the one or more trajectories;

suspending at least one of the one or more trajectories;

changing at least one of the one or more trajectories to a trajectory associated with another task; or alerting the one or more people about at least one of the one or more trajectories.

14. The robotic system of claim 8, wherein the processors are further configured to execute the instructions to:

generate a scene graph comprising a plurality of nodes, wherein each node represents one or more of:

an object associated with one or more attributes;

a pose of one of the one or more people;

an action by one of the one or more people; or
an action of the one or more actions to be performed by the robotic system, and
wherein generating the scene graph is based on one or more of:
an analysis of each of a plurality of tasks based on natural language understanding;
human pose estimation of poses associated with the one or more people based on sensor data captured by one or more sensors associated with the robotic system; or
object detection based on the sensor data.

15. A computer-readable non-transitory storage media comprising instructions executable by a processor of a robotic system to:
determine, for a task to be executed at least in part by the robotic system, one or more objects and one or more actions associated with the one or more objects for completing the task, wherein each action is associated with a trajectory;
determine, for each of one or more people in an environment associated with the robotic system, a pose of the respective person;
predict, for each of the one or more people and based on the determined pose associated with the respective person, a three-dimensional, bounded trajectory volume comprising a plurality of 3D volumes for the respective person, wherein each 3D volume of the predicted trajectory volume for each person is associated with a predicted probability that the respective person or an action of the respective person occupy that 3D volume during a particular timeframe; and
determine whether one or more trajectories associated with one or more actions of the robotic system passes through the trajectory volume during the particular timeframe; and
in response to a determination that one or more trajectories associated with one or more actions of the robotic system passes through the trajectory volume during the particular timeframe, then adjust the one or more trajectories associated with one or more actions of the robotic system; and
in response to a determination that one or more trajectories associated with one or more actions of the robotic system does not pass through the trajectory volume in the particular timeframe, then leave the one or more trajectories associated with one or more actions of the robotic system unchanged.

16. The media of claim 15, wherein the instructions are further executable by the processor to:
determine, for each of the one or more objects, a pose and one or more attributes of the respective object based on sensor data captured by one or more sensors associated with the robotic system.

17. The media of claim 16, wherein the three-dimensional trajectory volume is further predicted based on the pose and or more attributes of at least one of the one or more objects.

18. The media of claim 15, wherein the instructions are further executable by the processor to:
predict, for each of the one or more people, a pose of a hand of the respective person based on one or more of:
attributes of one or more of the objects;
poses of one or more of the objects;
one or more of the actions;
human kinematics associated with the respective person;
a three-dimensional (3D) scene representation of the environment associated with the robotic system, wherein the 3D scene representation is generated based on sensor data captured by one or more sensors associated with the robotic system; or
the determined pose associated with the respective person,
wherein predicting the three-dimensional trajectory volume for each of the one or more people is further based on the predicted pose of the hand of the respective person.

19. The media of claim 15, wherein each 3D volume comprises a voxel.

20. The media of claim 15, wherein adjusting the one or more trajectories associated with one or more actions of the robotic system comprises one or more of:
adjusting a route associated with at least one of the one or more trajectories;
adjusting a speed associated with at least one of the one or more trajectories;
suspending at least one of the one or more trajectories;
changing at least one of the one or more trajectories to a trajectory associated with another task; or
alerting the one or more people about at least one of the one or more trajectories.

* * * * *